(12) United States Patent
Sutardja

(10) Patent No.: US 7,885,760 B2
(45) Date of Patent: Feb. 8, 2011

(54) GPS-BASED TRAFFIC MONITORING SYSTEM

(75) Inventor: Sehat Sutardja, Los Altos Hills, CA (US)

(73) Assignee: Marvell World Trade Ltd., Hamilton (BM)

( * ) Notice: Subject to any disclaimer, the term of this patent is extended or adjusted under 35 U.S.C. 154(b) by 321 days.

(21) Appl. No.: 11/787,296

(22) Filed: Apr. 16, 2007

(65) Prior Publication Data

US 2008/0177459 A1 Jul. 24, 2008

Related U.S. Application Data

(63) Continuation of application No. 11/637,173, filed on Dec. 11, 2006, and a continuation-in-part of application No. 11/338,978, filed on Jan. 25, 2006, which is a continuation-in-part of application No. 11/171,563, filed on Jun. 30, 2005.

(60) Provisional application No. 60/868,174, filed on Dec. 1, 2006, provisional application No. 60/828,720, filed on Oct. 9, 2006.

(51) Int. Cl.
G08G 7/76 (2006.01)
(52) U.S. Cl. ...................... 701/117; 701/208
(58) Field of Classification Search ................. 701/200, 701/208, 117–119
See application file for complete search history.

(56) References Cited

U.S. PATENT DOCUMENTS

| | | | |
|---|---|---|---|
| 3,715,572 A | 2/1973 | Bennett | |
| 5,539,645 A | 7/1996 | Mandhyan et al. | |
| 5,812,069 A | 9/1998 | Albrecht et al. | |
| 5,910,782 A | 6/1999 | Schmitt et al. | |
| 5,933,100 A | 8/1999 | Golding | |
| 6,092,020 A | 7/2000 | Fastenrath et al. | |
| 6,150,961 A | 11/2000 | Alewine et al. | |
| 6,236,932 B1 | 5/2001 | Fastenrath | |

(Continued)

FOREIGN PATENT DOCUMENTS

EP 0 755 039 A 1/1997

(Continued)

OTHER PUBLICATIONS

ANSI/IEEE Std 802.11, 1999 Edition; Information technology—Telecommunications and information exchange between systems—Local and metropolitan area networks—Specific requirements—Part 11: Wireless LAN Medium Access Control (MAC) and Physical Layer (PHY) Specifications; LAN/MAN Standards Committee of the IEEE Computer Society; 528 pages.

(Continued)

Primary Examiner—Yonel Beaulieu

(57) ABSTRACT

A traffic monitoring system comprises memory for storing map data, a traffic report generating module that receives vector and location data from at least one of cellular phones and vehicles and that generates and transmits traffic reports based on the vector and location data. A map monitoring module includes a path determining module that determines a travel path of the at least one of the cellular phones and the vehicles based on the vector and location data, a comparing module that compares the travel path to roads defined by the map data, and an identifying module that selectively identifies new roads based on the comparison.

48 Claims, 25 Drawing Sheets

U.S. PATENT DOCUMENTS

| | | |
|---|---|---|
| 6,266,609 B1 | 7/2001 | Fastenrath |
| 6,333,703 B1 | 12/2001 | Alewine et al. |
| 6,407,698 B1 | 6/2002 | Ayed |
| 6,418,374 B2 | 7/2002 | Sakamoto et al. |
| 6,426,709 B1 | 7/2002 | Becker et al. |
| 6,466,862 B1 | 10/2002 | DeKock et al. |
| 6,473,688 B2 | 10/2002 | Kohno et al. |
| 6,480,783 B1 | 11/2002 | Myr |
| 6,501,391 B1 | 12/2002 | Racunas, Jr. |
| 6,564,259 B1 | 5/2003 | Barber et al. |
| 6,611,688 B1 | 8/2003 | Raith |
| 6,707,421 B1 | 3/2004 | Drury et al. |
| 6,711,493 B1 | 3/2004 | Andrews et al. |
| 6,741,927 B2 | 5/2004 | Jones |
| 6,791,472 B1 | 9/2004 | Hoffberg |
| 6,798,356 B2 | 9/2004 | Flick |
| 6,801,837 B2 | 10/2004 | Carlstedt et al. |
| 6,804,524 B1 | 10/2004 | Vandermeijden |
| 6,804,602 B2 | 10/2004 | Impson et al. |
| 6,965,325 B2 | 11/2005 | Finnern |
| 6,973,384 B2 | 12/2005 | Zhao et al. |
| 7,268,700 B1 | 9/2007 | Hoffberg |
| 7,392,130 B1 | 6/2008 | Rosen et al. |
| 7,505,784 B2 | 3/2009 | Barbera |
| 2002/0019703 A1 | 2/2002 | Levine |
| 2002/0154035 A1 | 10/2002 | Flick |
| 2002/0171562 A1 | 11/2002 | Muraki |
| 2003/0014180 A1 | 1/2003 | Myr |
| 2003/0112154 A1 | 6/2003 | Yoakum et al. |
| 2003/0162536 A1 | 8/2003 | Panico |
| 2003/0225600 A1 | 12/2003 | Slivka et al. |
| 2004/0104842 A1 | 6/2004 | Drury et al. |
| 2004/0119612 A1 | 6/2004 | Chen |
| 2004/0233070 A1 | 11/2004 | Finnern |
| 2004/0246147 A1 | 12/2004 | Von Grabe |
| 2005/0065711 A1 | 3/2005 | Dahlgren et al. |
| 2005/0143096 A1 | 6/2005 | Boesch |
| 2005/0171663 A1 | 8/2005 | Mittelsteadt et al. |
| 2005/0256762 A1 | 11/2005 | Dar et al. |
| 2006/0025897 A1 | 2/2006 | Shostak et al. |
| 2006/0136291 A1 | 6/2006 | Morita et al. |
| 2006/0226968 A1 | 10/2006 | Tengler et al. |
| 2006/0250278 A1 | 11/2006 | Tillotson et al. |
| 2007/0010241 A1 | 1/2007 | Wachter et al. |

FOREIGN PATENT DOCUMENTS

| | | |
|---|---|---|
| EP | 1081668 A2 | 3/2001 |
| EP | DE 101 36 342 A1 | 3/2002 |
| EP | DE 100 54 573 A1 | 5/2002 |
| EP | DE 102 30 104 A1 | 1/2004 |
| EP | GB 2 405 204 A | 2/2005 |
| JP | 2004 150827 A | 1/2004 |
| WO | WO 02/071364 | 9/2002 |
| WO | WO 02/089089 | 11/2002 |
| WO | WO 2005/098780 A | 10/2005 |
| WO | WO 2006/085410 A | 8/2006 |

OTHER PUBLICATIONS

IEEE Std 802.11a-1999 (Supplement to IEEE Std 802.11-1999) [Adopted by ISO/IEC and redesignated as ISO/IEC 8802-11: 1999/ Amd 1:2000(E)]; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications High-speed Physical Layer in the 5 GHz Band; LAN/MAN Standards Committee of the IEEE Computer Society; 91 pages.

IEEE Std 802.11b-1999 (Supplement to IEEE Std 802.11-1999 Edition); Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band; LAN/MAN Standards Committee of the IEEE Computer Society; Sep. 16, 1999 IEEE-SA Standards Board; 96 pages.

IEEE Std 802.11b-1999/Cor 1-2001 (Corrigendum to IEEE Std 802.11-1999); IEEE Standard for Information technology—Telecommunications and information exchange between systems—Local and metropolitan area networks—Specific requirements—Part 11: Wireless LAN Medium Access Control (MAC) and Physical Layer (PHY) specifications Amendment 2: Higher-Speed Physical Layer (PHY) extension in the 2.4 GHz Band—Corrigendum 1; LAN/MAN Standards Committee of the IEEE Computer Society; Nov. 7, 2001; 23 pages.

IEEE P802.11g/D8.2, Apr. 2003 (Supplement to ANSI/IEEE Std 802.11-1999(Reaff 2003)); Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; LAN/ MAN Standards Committee of the IEEE Computer Society; 69 pages.

IEEE 802.11n; IEEE 802.11-04/0889r6; IEEE P802.11 Wireless LANs; TGn Sync Proposal Technical Specification; May 2005; 131 pages.

IEEE Standard 802.16-2004; IEEE Standard for Local and metropolitan area networks, Part 16: Air Interface for Fixed Broadband Wireless Access Systems, IEEE Computer Society and the IEEE Microwave Theory and Techniques Society; Oct. 1, 2004, 857 pages.

Wolfgang Schneider; "Talking Cars"; BMW Magazine, The New Roadster Generation; Jan. 2006; 6 pages.

Notification of Transmittal of The International Search Report and The Written Opinion of The International Searching Authority, or The Declaration dated Apr. 25, 2008 in reference to PCT/US2007/018643 (13 pgs).

Notification of Transmittal of The International Search Report and The Written Opinion of The International Searching Authority, or The Declaration dated Apr. 25, 2008 in reference to PCT/US2007/020524 (15 pgs).

Official Action including the Search Report and Written Opinion from the Intellectual Property Office of Singapore dated Sep. 3, 2007 for Application No. SG 200603453-2; 9 pages.

Notification of European Search Report dated Apr. 7, 2009 in reference to European Patent Application 06011022.8-2215/ 1742191 (18 pgs).

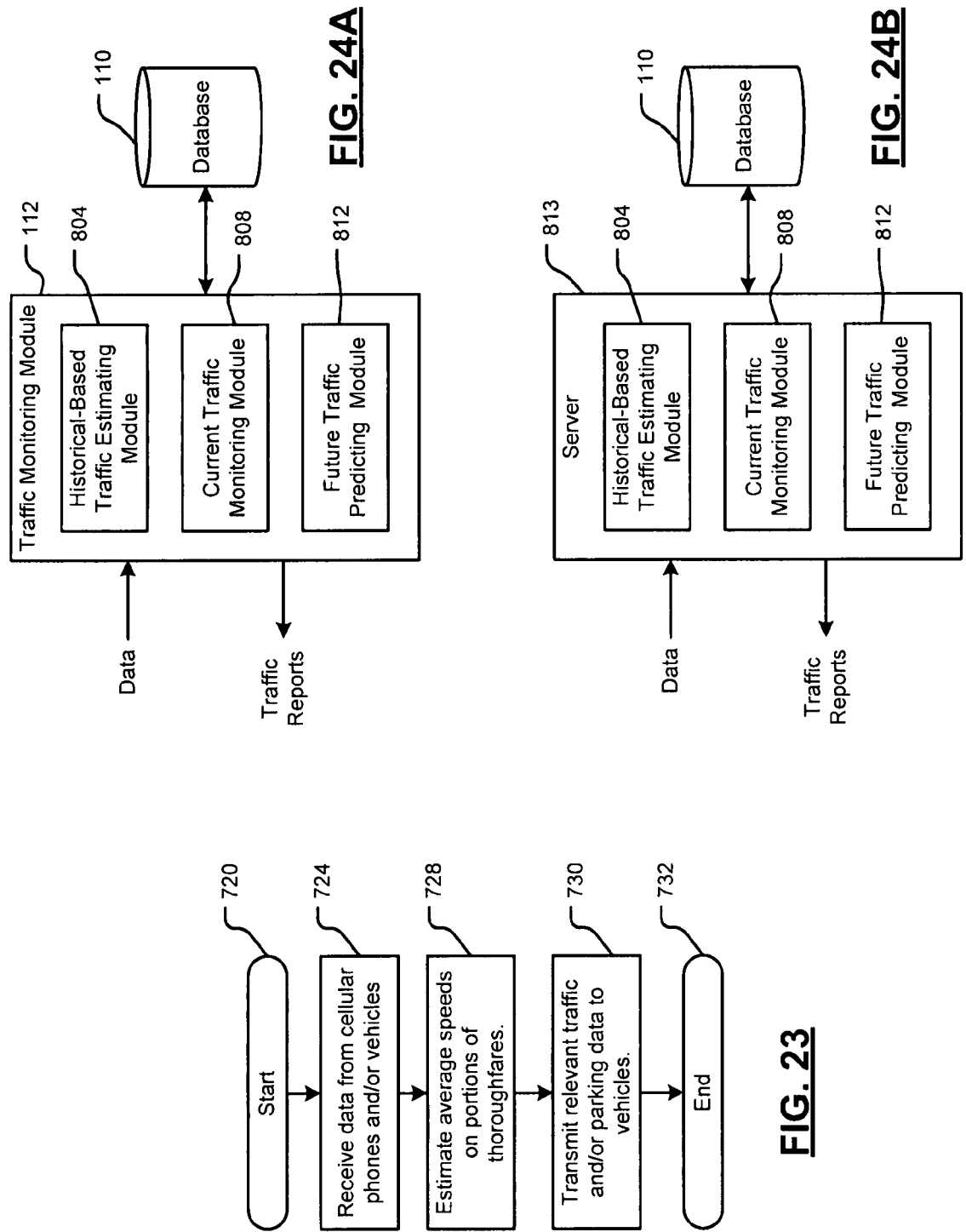

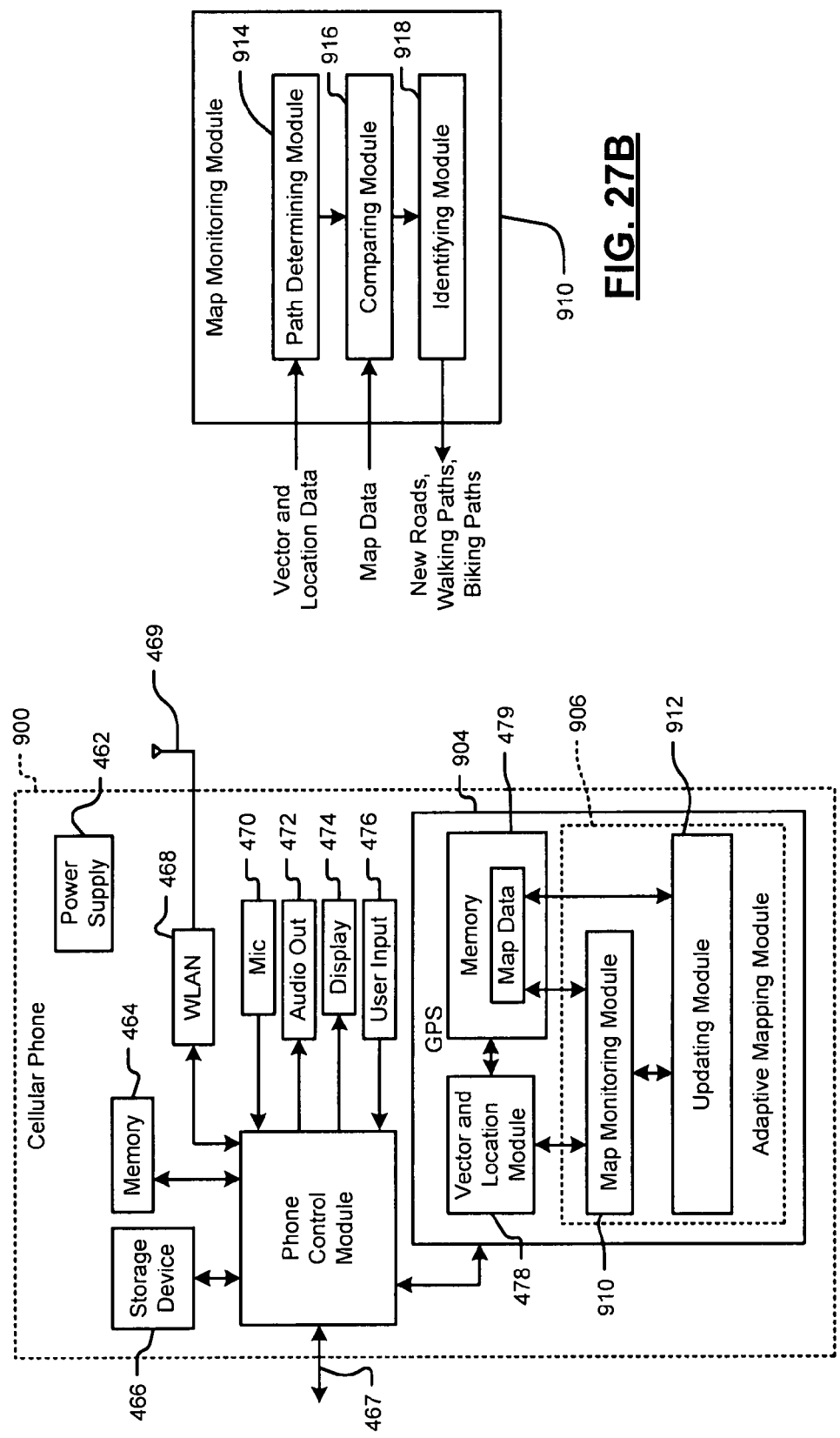

7,885,760 B2

GPS-BASED TRAFFIC MONITORING SYSTEM

CROSS-REFERENCE TO RELATED APPLICATIONS

This application is a continuation of U.S. patent application Ser. No. 11/637,173, filed Dec. 11, 2006, which claims the benefit of U.S. Provisional Application No. 60/868,174, filed on Dec. 1, 2006, and 60/828,720, filed on Oct. 9, 2006, which is a continuation-in-part of U.S. patent application Ser. No. 11/338,978 filed on Jan. 25, 2006, which is a continuation-in-part of U.S. patent application Ser. No. 11/171,563 filed on Jun. 30, 2005. The disclosures of the above applications are incorporated herein by reference in their entirety.

FIELD OF THE INVENTION

The present invention relates to traffic monitoring systems, and more particularly to global positioning system (GPS)-based traffic monitoring systems for vehicles.

BACKGROUND OF THE INVENTION

Global positioning systems (GPS) for vehicles typically include a receiver that triangulates vehicle position using beacons generated by GPS satellites. These systems also typically include a map database that is used to provide the location of the vehicle on a map, driving directions, the location of restaurants and other businesses, and/or other information. As cities become more populated, it has become more difficult to travel without incurring delays due to traffic congestion, accidents, construction and/or other problems. Finding parking in congested cities can also be difficult.

SUMMARY OF THE INVENTION

A traffic monitoring system comprises a traffic estimating module that estimates an average traffic level on the road during prior ones of first periodic periods. A traffic monitoring module estimates a current traffic level on the road during a first portion of a current one of the first periodic periods based on vector and location information received from at least one of cellular phones and vehicles during the first portion. A traffic predicting module predicts traffic levels on the road during a remaining portion of the current one of the first periodic periods based on the average traffic level and the estimated current traffic level during the first portion.

In other features, the traffic monitoring system comprises a cellular phone includes a global positioning system (GPS) that selectively generates vector and location data, a transmitter, and a control module that selectively wirelessly transmits vector and location data of the cellular phone using the transmitter. The control module transmits the vector and location data of the cellular phone when the cellular phone is traveling on a first set of predetermined roads and does not transmit the vector and location data when the cellular phone is traveling on a second set of roads. The control module transmits the vector and location data of the cellular phone when the cellular phone is traveling at a speed greater than a first threshold and does not transmit the vector and location data when the cellular phone is traveling at a speed that is less than the first threshold. A traffic report generator generates traffic reports based on the vector and location data, wherein the cellular phone includes a receiver that communicates with the control module and that wirelessly receives the traffic reports. The traffic reports include traffic speed information for traffic traveling on at least one road.

In other features, the traffic monitoring system includes a cellular phone, and a cellular phone tracking module that generates vector and location data for the cellular phone. The cellular phone tracking module compares a speed of the cellular phone on a first road to a first threshold and to an average traffic speed on the first road and that selectively triggers contact with the cellular phone. The control module transmits the vector and location data on a periodic basis. The control module monitors changes in direction of the cellular phone and transmits the vector and location data when the cellular phone changes direction greater than a direction change threshold.

A method for operating a traffic monitoring system comprises estimating an average traffic level on the road during prior ones of first periodic periods; estimating a current traffic level on the road during a first portion of a current one of the first periodic periods based on vector and location information received from at least one of cellular phones and vehicles during the first portion; and predicting traffic levels on the road during a remaining portion of the current one of the first periodic periods based on the average traffic level and the estimated current traffic level during the first portion.

In other features, the method includes providing a cellular phone including a global positioning system (GPS) that selectively generates vector and location data, a transmitter, and a control module that selectively wirelessly transmits vector and location data of the cellular phone using the transmitter. The method includes transmitting the vector and location data of the cellular phone when the cellular phone is traveling on a first set of predetermined roads and not transmitting the vector and location data when the cellular phone is traveling on a second set of roads.

In other features, the method includes transmitting the vector and location data of the cellular phone when the cellular phone is traveling at a speed greater than a first threshold and not transmitting the vector and location data when the cellular phone is traveling at a speed that is less than the first threshold. The method includes generating traffic reports based on the vector and location data; and wirelessly receiving the traffic reports at the cellular phone. The traffic reports include traffic speed information for traffic traveling on at least one road. The method includes providing a cellular phone and providing a cellular phone tracking module that generates vector and location data for the cellular phone. The method includes comparing a speed of the cellular phone on a first road to a first threshold and to an average traffic speed on the first road; and selectively triggering contact with the cellular phone. The method includes transmitting the vector and location data on a periodic basis. The method includes monitoring changes in direction of the cellular phone; and transmitting the vector and location data when the cellular phone changes direction greater than a direction change threshold.

A traffic monitoring system comprises traffic estimating means for estimating an average traffic level on the road during prior ones of first periodic periods; traffic monitoring means for estimating a current traffic level on the road during a first portion of a current one of the first periodic periods based on vector and location information received from at least one of cellular phones and vehicles during the first portion; and traffic predicting means for predicting traffic levels on the road during a remaining portion of the current one of the first periodic periods based on the average traffic level and the estimated current traffic level during the first portion.

In other features, the traffic monitoring system includes a cellular phone including global positioning means for selectively generating vector and location data; transmitting means for transmitting data; and control means for selectively wirelessly transmitting vector and location data of the cellular phone using the transmitting means. The control means transmits the vector and location data of the cellular phone when the cellular phone is traveling on a first set of predetermined roads and does not transmit the vector and location data when the cellular phone is traveling on a second set of roads. The control means transmits the vector and location data of the cellular phone when the cellular phone is traveling at a speed greater than a first threshold and does not transmit the vector and location data when the cellular phone is traveling at a speed that is less than the first threshold. Traffic report generating means generates traffic reports based on the vector and location data, wherein the cellular phone includes a receiver that communicates with the control means and that wirelessly receives the traffic reports. The traffic reports include traffic speed information for traffic traveling on at least one road.

In other features, the traffic monitoring system includes a cellular phone; and cellular phone tracking means for generating vector and location data for the cellular phone. The cellular phone tracking means compares a speed of the cellular phone on a first road to a first threshold and to an average traffic speed on the first road and that selectively triggers contact with the cellular phone. The control means transmits the vector and location data on a periodic basis. The control means monitors changes in direction of the cellular phone and transmits the vector and location data when the cellular phone changes direction greater than a direction change threshold.

A cellular phone comprises a cellular phone control module that controls the cellular phone; a global positioning system (GPS) that selectively generates vector and location data; and a transmitter, wherein the cellular phone control module selectively wirelessly transmits the vector and location data using the transmitter when at least one of: the cellular phone is traveling on a first set of predetermined roads and does not transmit the vector and location data when the cellular phone is traveling on a second set of roads; and the cellular phone is traveling at a first speed that is greater than a predetermined speed.

In other features, the cellular phone includes a receiver that communicates with the cellular phone control module and that wirelessly receives traffic reports from a remote traffic monitoring system. The traffic reports include traffic speed information for traffic traveling on at least one of the first set of predetermined roads.

In other features, a traffic monitoring system comprises the cellular phone and further comprises a remote traffic monitoring system that receives the vector and location data and that compares a speed of the cellular phone on a first road to a first threshold and to an average traffic speed on the first road and that selectively triggers contact with the cellular phone. The cellular phone control module transmits the vector and location data on a periodic basis. The cellular phone control module monitors changes in direction of the cellular phone and transmits the vector and location data when the cellular phone changes direction greater than a direction change threshold.

In other features, a traffic monitoring system comprises the cellular phone and further comprises a traffic estimating module that estimates an average traffic level on the road during prior ones of first periodic periods. A traffic monitoring module estimates a current traffic level on the road during a first portion of a current one of the first periodic periods based on vector and location information received from at least one of cellular phones and vehicles during the first portion. A traffic predicting module predicts traffic levels on the road during a remaining portion of the current one of the first periodic periods based on the average traffic level and the estimated current traffic level during the first portion. The predetermined speed is based on a typical speed of a person one of walking or running.

A method for operating a cellular phone comprises providing a cellular phone control module that controls the cellular phone; selectively generating vector and location data using a global positioning system of the cellular phone; and selectively wirelessly transmitting the vector and location data using the transmitter when at least one of: the cellular phone is traveling on a first set of predetermined roads and does not transmit the vector and location data when the cellular phone is traveling on a second set of roads; and the cellular phone is traveling at a first speed that is greater than a predetermined speed.

In other features, the method includes wirelessly receiving traffic reports from a remote traffic monitoring system at the cellular phone. The traffic reports include traffic speed information for traffic traveling on at least one of the first set of predetermined roads. The method includes receiving the vector and location data at a remote traffic monitoring system; comparing a speed of the cellular phone on a first road to a first threshold and to an average traffic speed on the first road; and selectively triggering contact with the cellular phone.

In other features, the method includes transmitting the vector and location data on a periodic basis. The method includes monitoring changes in direction of the cellular phone; and transmitting the vector and location data when the cellular phone changes direction greater than a direction change threshold. The method includes estimating an average traffic level on the road during prior ones of first periodic periods. The method includes estimating a current traffic level on the road during a first portion of a current one of the first periodic periods based on vector and location information received from at least one of cellular phones and vehicles during the first portion. The method includes predicting traffic levels on the road during a remaining portion of the current one of the first periodic periods based on the average traffic level and the estimated current traffic level during the first portion. The predetermined speed is based on a typical speed of a person one of walking or running.

A cellular phone comprises cellular phone control means for controlling the cellular phone; global positioning means for selectively generating vector and location data; and transmitting means for transmitting data. The cellular phone control means selectively wirelessly transmits the vector and location data using the transmitting means when at least one of: the cellular phone is traveling on a first set of predetermined roads and does not transmit the vector and location data when the cellular phone is traveling on a second set of roads; and the cellular phone is traveling at a first speed that is greater than a predetermined speed.

In other features, the cellular phone includes receiving means for communicating with the cellular phone control means and for wirelessly receiving traffic reports from a remote traffic monitoring system. The traffic reports include traffic speed information for traffic traveling on at least one of the first set of predetermined roads.

In other features, a traffic monitoring system comprises the cellular phone and further comprises remote traffic monitoring means for receiving the vector and location data and for comparing a speed of the cellular phone on a first road to a first threshold and to an average traffic speed on the first road and for selectively triggering contact with the cellular phone. The cellular phone control means transmits the vector and location data on a periodic basis. The cellular phone control means monitors changes in direction of the cellular phone and transmits the vector and location data when the cellular phone changes direction greater than a direction change threshold.

In other features, a traffic monitoring system comprises the cellular phone and further comprises traffic estimating means for estimating an average traffic level on the road during prior ones of first periodic periods. Traffic monitoring means estimates a current traffic level on the road during a first portion of a current one of the first periodic periods based on vector and location information received from at least one of cellular phones and vehicles during the first portion. Traffic predicting means predicts traffic levels on the road during a remaining portion of the current one of the first periodic periods based on the average traffic level and the estimated current traffic level during the first portion. The predetermined speed is based on a typical speed of a person one of walking or running.

A traffic monitoring system comprises a cellular phone system that communicates with a plurality of cellular phones and that generates vector and location data for the plurality of cellular phones. A traffic monitoring module communicates with the cellular phone system, generates traffic reports based on the vector and location data from the plurality of cellular phones, and selectively enables use of the vector and location data from at least one of the cellular phones when at least one of: a speed of the at least one of the cellular phones is greater than a predetermined speed; and the traffic monitoring module receives vector and location data from a second one of the cellular phones and the second one of the cellular phones is traveling in the same or an opposite direction as the first one of the cellular phones and has a speed that is within a predetermined difference of a speed of the first one of the cellular phones. In other features, the predetermined speed is greater than a typical speed of one of a person walking or running.

In other features, the first one of the cellular phones includes a global positioning system (GPS) that selectively generates vector and location data; a transmitter; and a control module that receives the vector and location data and that wirelessly transmits the vector and location data using the transmitter. The control module selectively transmits the vector and location data when the cellular phone is traveling on a first set of predetermined roads and does not transmit the vector and location data when the cellular phone is traveling on a second set of roads. The first one of the cellular phones includes a receiver that communicates with the control module and that wirelessly receives traffic reports from a remote traffic monitoring system. The traffic reports include traffic speed information for traffic traveling on at least one of the first set of predetermined roads. The cellular phone system selectively transmits the vector and location data for the cellular phones on a periodic basis. The cellular phone system monitors changes in direction of the cellular phones and transmits the vector and location data for the cellular phones when the cellular phones change direction greater than a direction change threshold. The cellular phone system monitors changes in speed of the cellular phones. The cellular phone transmits the vector and location data for the cellular phones when the cellular phones change speed greater than a speed change threshold.

A method for operating a traffic monitoring system comprises providing a cellular phone system that communicates with a plurality of cellular phones and that generates vector and location data for the plurality of cellular phones; and generating traffic reports based on the vector and location data from the plurality of cellular phones using a traffic monitoring module; selectively enabling use of the vector and location data from at least one of the cellular phones when at least one of: a speed of the at least one of the cellular phones is greater than a predetermined speed; and the traffic monitoring module receives vector and location data from a second one of the cellular phones and the second one of the cellular phones is traveling in the same or an opposite direction as the first one of the cellular phones and has a speed that is within a predetermined difference of a speed of the first one of the cellular phones.

In other features, the predetermined speed is based on a speed of one of a person walking or running. The first one of the cellular phones includes a global positioning system (GPS) that selectively generates vector and location data; a transmitter; and a control module that receives the vector and location data and that wirelessly transmits the vector and location data using the transmitter. The method includes selectively transmitting the vector and location data when the cellular phone is traveling on a first set of predetermined roads; and not transmitting the vector and location data when the cellular phone is traveling on a second set of roads. The method includes wirelessly receiving traffic reports from a remote traffic monitoring system at the first one of the cellular phones. The traffic reports include traffic speed information for traffic traveling on at least one of the first set of predetermined roads. The cellular phone system selectively transmits the vector and location data for the cellular phones on a periodic basis. The method includes monitoring changes in direction of the cellular phones; and transmitting the vector and location data for the cellular phones when the cellular phones change direction greater than a direction change threshold. The method includes monitoring changes in speed of the cellular phones. The method includes transmitting the vector and location data for the cellular phones when the cellular phones change speed greater than a speed change threshold.

A traffic monitoring system comprises a cellular phone system that communicates with a plurality of cellular phones and that generates vector and location data for the plurality of cellular phones. Traffic monitoring means, that communicates with the cellular phone system, generates traffic reports based on the vector and location data from the plurality of cellular phones, and selectively enables use of the vector and location data from at least one of the cellular phones when at least one of: a speed of the at least one of the cellular phones is greater than a predetermined speed; and the traffic monitoring means receives vector and location data from a second one of the cellular phones and the second one of the cellular phones is traveling in the same or an opposite direction as the first one of the cellular phones and has a speed that is within a predetermined difference of a speed of the first one of the cellular phones.

In other features, the predetermined speed is greater than a typical speed of one of a person walking or running. The first one of the cellular phones includes a global positioning means for selectively generating vector and location data; transmitting means for transmitting; and control means for receiving the vector and location data and for wirelessly transmitting the vector and location data using the transmitting means. The control means selectively transmits the vector and location data when the cellular phone is traveling on a first set of predetermined roads and does not transmit the vector and location data when the cellular phone is traveling on a second set of roads. The first one of the cellular phones includes receiving means for communicating with the control means and for wirelessly receiving traffic reports from remote traffic monitoring means for remotely monitoring traffic. The traffic reports include traffic speed information for traffic traveling on at least one of the first set of predetermined roads.

The cellular phone system selectively transmits the vector and location data for the cellular phones on a periodic basis. The cellular phone system monitors changes in direction of the cellular phones and transmits the vector and location data for the cellular phones when the cellular phones change direction greater than a direction change threshold. The cellular phone system monitors changes in speed of the cellular phones. The cellular phone transmits the vector and location data for the cellular phones when the cellular phones change speed greater than a speed change threshold.

A traffic monitoring system comprises memory for storing map data; a traffic report generating module that receives vector and location data from at least one of cellular phones and vehicles and that generates and transmits traffic reports based on the vector and location data; and an adaptive map building module including: a path determining module that determines a travel path of the at least one of the cellular phones and the vehicles based on the vector and location data; a comparing module that compares the travel path to roads defined by the map data; and an identifying module that selectively identifies new roads based on the comparison.

In other features, a generating module generates new road data when the new roads are identified. An updating module selectively transmits the new road data to the at least one of the cellular phones and the vehicles. The path identifying module determines a speed of the cellular phones on the travel path, the comparing module compares the speed to first and second predetermined speeds and the identifying module selectively identifies new walking paths based on the comparison. The generating module generates new walking path data when the new walking paths are identified. The updating module selectively transmits the new walking path data to the at least one of the cellular phones and the vehicles. The first predetermined speed is equal to a typical minimum walking speed and the second predetermined speed is equal to a typical maximum walking speed.

In other features, the path identifying module determines a speed of the cellular phones on the travel path, the comparing module compares the speed to first and second predetermined speeds and the identifying module selectively identifies new biking paths based on the comparison, wherein the first predetermined speed is equal to a typical minimum biking speed and the second predetermined speed is equal to a typical maximum biking speed. The generating module generates new biking path data when the new biking paths are identified. The updating module selectively transmits the new biking paths to the at least one of the cellular phones and the vehicles.

A traffic monitoring system comprises storing means for storing map data; traffic report generating means for receiving vector and location data from at least one of cellular phones and vehicles and for generating and transmitting traffic reports based on the vector and location data; and adaptive map building means for updating the map data including: path determining means for determining a travel path of the at least one of the cellular phones and the vehicles based on the vector and location data; comparing means for comparing the travel path to roads defined by the map data; and identifying means for selectively identifying new roads based on the comparison.

In other features, generating means generates new road data when the new roads are identified. Updating means selectively transmits the new road data to the at least one of the cellular phones and the vehicles. The path identifying means determines a speed of the cellular phones on the travel path, the comparing means compares the speed to first and second predetermined speeds and the identifying means selectively identifies new walking paths based on the comparison. The generating means generates new walking path data when the new walking paths are identified. The updating means selectively transmits the new walking path data to the at least one of the cellular phones and the vehicles. The first predetermined speed is equal to a typical minimum walking speed and the second predetermined speed is equal to a typical maximum walking speed.

In other features, the path identifying means determines a speed of the cellular phones on the travel path, the comparing means compares the speed to first and second predetermined speeds and the identifying means selectively identifies new biking paths based on the comparison. The first predetermined speed is equal to a typical minimum biking speed and the second predetermined speed is equal to a typical maximum biking speed. The generating means generates new biking path data when the new biking paths are identified. The updating means selectively transmits the new biking paths to the at least one of the cellular phones and the vehicles.

A method for providing a traffic monitoring system comprises storing map data; receiving vector and location data from at least one of cellular phones and vehicles and generating and transmitting traffic reports based on the vector and location data; determining a travel path of the at least one of the cellular phones and the vehicles based on the vector and location data; comparing the travel path to roads defined by the map data; and selectively identifying new roads based on the comparison.

In other features, the method includes generating new road data when the new roads are identified. The method includes selectively transmitting the new road data to the at least one of the cellular phones and the vehicles. The method includes determining a speed of the cellular phones on the travel path, comparing the speed to first and second predetermined speeds and selectively identifying new walking paths based on the comparison. The method includes generating new walking path data when the new walking paths are identified. The method includes selectively transmitting the new walking path data to the at least one of the cellular phones and the vehicles. The first predetermined speed is equal to a typical minimum walking speed and the second predetermined speed is equal to a typical maximum walking speed.

In other features, the method includes determining a speed of the cellular phones on the travel path; comparing the speed to first and second predetermined speeds; and selectively identifying new biking paths based on the comparison. The first predetermined speed is equal to a typical minimum biking speed and the second predetermined speed is equal to a typical maximum biking speed. The method includes generating new biking path data when the new biking paths are identified. The method includes selectively transmitting the new biking paths to the at least one of the cellular phones and the vehicles.

A computer program stored for use by a processor for providing a traffic monitoring system comprises storing map data; receiving vector and location data from at least one of cellular phones and vehicles and generating and transmitting traffic reports based on the vector and location data; determining a travel path of the at least one of the cellular phones and the vehicles based on the vector and location data; comparing the travel path to roads defined by the map data; and selectively identifying new roads based on the comparison.

In other features, the method includes generating new road data when the new roads are identified. The method includes selectively transmitting the new road data to the at least one of the cellular phones and the vehicles. The method includes determining a speed of the cellular phones on the travel path, comparing the speed to first and second predetermined speeds and selectively identifying new walking paths based on the comparison. The method includes generating new walking path data when the new walking paths are identified. The method includes selectively transmitting the new walking path data to the at least one of the cellular phones and the vehicles. The first predetermined speed is equal to a typical minimum walking speed and the second predetermined speed is equal to a typical maximum walking speed.

In other features, the method includes determining a speed of the cellular phones on the travel path; comparing the speed to first and second predetermined speeds; and selectively identifying new biking paths based on the comparison, wherein the first predetermined speed is equal to a typical minimum biking speed and the second predetermined speed is equal to a typical maximum biking speed. The method includes generating new biking path data when the new biking paths are identified. The method includes selectively transmitting the new biking paths to the at least one of the cellular phones and the vehicles.

A vehicle comprises memory for storing map data; a global positioning system (GPS) module that transmits vector and location data and that receives traffic reports from a remote traffic monitoring system; and an adaptive map building module including: a path determining module that determines a travel path of the vehicle based on the vector and location data; a comparing module that compares the travel path to roads defined by the map data; and an identifying module that selectively identifies new roads based on the comparison.

In other features, a generating module generates new road data when the new roads are identified. An updating module selectively transmits the new road data to the memory. An updating module selectively transmits the new road data to the remote traffic monitoring system.

A cellular phone comprises memory for storing map data; a global positioning system (GPS) module that transmits vector and location data and that receives traffic reports from a remote traffic monitoring system; and an adaptive map building module including: a path determining module that determines a travel path of the cellular phone and based on the vector and location data; a comparing module that compares the travel path to roads defined by the map data; and an identifying module that selectively identifies new roads based on the comparison.

In other features, a generating module generates new road data when the new roads are identified. An updating module selectively transmits the new road data to at least one of the memory and the remote traffic monitoring system. The path identifying module determines a speed of the cellular phone on the travel path, the comparing module compares the speed to first and second predetermined speeds and the identifying module selectively identifies new walking paths based on the comparison. The generating module generates new walking path data when the new walking paths are identified. The updating module selectively transmits the new walking path data to at least one of the memory and the remote traffic monitoring system. The first predetermined speed is equal to a typical minimum walking speed and the second predetermined speed is equal to a typical maximum walking speed.

In other features, the path identifying module determines a speed of the cellular phone on the travel path, the comparing module compares the speed to first and second predetermined speeds and the identifying module selectively identifies new biking paths based on the comparison. The generating module generates new biking path data when the new biking paths are identified. The updating module selectively transmits the new biking paths to at least one of the memory and the remote traffic monitoring system. The first predetermined speed is equal to a typical minimum biking speed and the second predetermined speed is equal to a typical maximum biking speed.

A vehicle comprises storing means for storing map data; global positioning system (GPS) means for transmitting vector and location data and for receiving traffic reports from a remote traffic monitoring system; and adaptive map building means for updating the map data including: path determining means for determining a travel path of the vehicle based on the vector and location data; comparing means for comparing the travel path to roads defined by the map data; and identifying means for selectively identifying new roads based on the comparison.

In other features, generating means generates new road data when the new roads are identified. Updating means selectively transmits the new road data to the storing means. Updating means selectively transmits the new road data to the remote traffic monitoring system.

A cellular phone comprises storing means for storing map data; global positioning system (GPS) means for transmitting vector and location data and for receiving traffic reports from a remote traffic monitoring system; and adaptive map building means for updating the map data including: path determining means for determining a travel path of the cellular phone based on the vector and location data; comparing means for comparing the travel path to roads defined by the map data; and identifying means for selectively identifying new roads based on the comparison.

In other features, generating means generates new road data when the new roads are identified. Updating means selectively transmits the new road data to at least one of the storing means and the remote traffic monitoring system. The path identifying means determines a speed of the cellular phone on the travel path, the comparing means compares the speed to first and second predetermined speeds and the identifying means selectively identifies new walking paths based on the comparison. The generating means generates new walking path data when the new walking paths are identified. The updating means selectively transmits the new walking path data to at least one of the storing means and the remote traffic monitoring system. The first predetermined speed is equal to a typical minimum walking speed and the second predetermined speed is equal to a typical maximum walking speed. The path identifying means determines a speed of the cellular phone on the travel path, the comparing means compares the speed to first and second predetermined speeds and the identifying means selectively identifies new biking paths based on the comparison. The generating means generates new biking path data when the new biking paths are identified. The updating means selectively transmits the new biking paths to at least one of the storing means and the remote traffic monitoring system. The first predetermined speed is equal to a typical minimum biking speed and the second predetermined speed is equal to a typical maximum biking speed.

A method for providing map data in a vehicle comprises storing map data; transmitting vector and location data and receiving traffic reports from a remote traffic monitoring system; determining a travel path of the vehicle based on the vector and location data; comparing the travel path to roads defined by the map data; and selectively identifying new roads based on the comparison.

In other features, the method includes generating new road data when the new roads are identified. The method includes selectively transmitting the new road data to the memory. The method includes selectively transmitting the new road data to the remote traffic monitoring system.

A method for providing map data in a cellular phone comprises storing map data; transmitting vector and location data; receiving traffic reports from a remote traffic monitoring system; determining a travel path of the cellular phone and based on the vector and location data; comparing the travel path to roads defined by the map data; and selectively identifying new roads based on the comparison.

In other features, the method includes generating new road data when the new roads are identified. The method includes selectively transmitting the new road data to at least one of the memory and the remote traffic monitoring system. The method includes determining a speed of the cellular phone on the travel path, comparing the speed to first and second predetermined speeds and selectively identifying new walking paths based on the comparison. The method includes generating new walking path data when the new walking paths are identified. The method includes selectively transmitting the new walking path data to at least one of the memory and the remote traffic monitoring system. The first predetermined speed is equal to a typical minimum walking speed and the second predetermined speed is equal to a typical maximum walking speed.

In other features, the method includes determining a speed of the cellular phone on the travel path, comparing the speed to first and second predetermined speeds and selectively identifying new biking paths based on the comparison. The method includes generating new biking path data when the new biking paths are identified. The method includes selectively transmitting the new biking paths to at least one of the memory and the remote traffic monitoring system. The first predetermined speed is equal to a typical minimum biking speed and the second predetermined speed is equal to a typical maximum biking speed.

A computer program stored for use by a processor for providing map data in a vehicle comprises storing map data; transmitting vector and location data and receiving traffic reports from a remote traffic monitoring system; determining a travel path of the vehicle based on the vector and location data; comparing the travel path to roads defined by the map data; and selectively identifying new roads based on the comparison.

In other features, the computer program includes generating new road data when the new roads are identified. The computer program includes selectively transmitting the new road data to the memory. The computer program includes selectively transmitting the new road data to the remote traffic monitoring system.

A computer program stored for use by a processor for providing map data in a cellular phone comprises storing map data; transmitting vector and location data; receiving traffic reports from a remote traffic monitoring system; determining a travel path of the cellular phone and based on the vector and location data; comparing the travel path to roads defined by the map data; and selectively identifying new roads based on the comparison.

In other features, the computer program includes generating new road data when the new roads are identified. The computer program includes selectively transmitting the new road data to at least one of the memory and the remote traffic monitoring system. The computer program includes determining a speed of the cellular phone on the travel path, comparing the speed to first and second predetermined speeds and selectively identifying new walking paths based on the comparison. The computer program includes generating new walking path data when the new walking paths are identified. The computer program includes selectively transmitting the new walking path data to at least one of the memory and the remote traffic monitoring system. The first predetermined speed is equal to a typical minimum walking speed and the second predetermined speed is equal to a typical maximum walking speed.

In other features, the computer program includes determining a speed of the cellular phone on the travel path, comparing the speed to first and second predetermined speeds and selectively identifying new biking paths based on the comparison. The computer program includes generating new biking path data when the new biking paths are identified. The computer program includes selectively transmitting the new biking paths to at least one of the memory and the remote traffic monitoring system. The first predetermined speed is equal to a typical minimum biking speed and the second predetermined speed is equal to a typical maximum biking speed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 13B illustrates steps performed by the traffic monitor system for updating traffic information based on lanes that vehicles are traveling in;

FIG. 23 is a flow chart illustrating steps performed by the traffic monitoring system for receiving and processing traffic and parking data based on data from cellular phones and vehicles;

FIG. 24A is a functional block diagram of an alternate traffic monitoring module;

FIG. 24B is a functional block diagram of a server;

FIGS. 27A and 27B are functional block diagrams of a cellular phone including a user-based adaptive map building module;

DETAILED DESCRIPTION OF THE PREFERRED EMBODIMENTS

Figure 1:
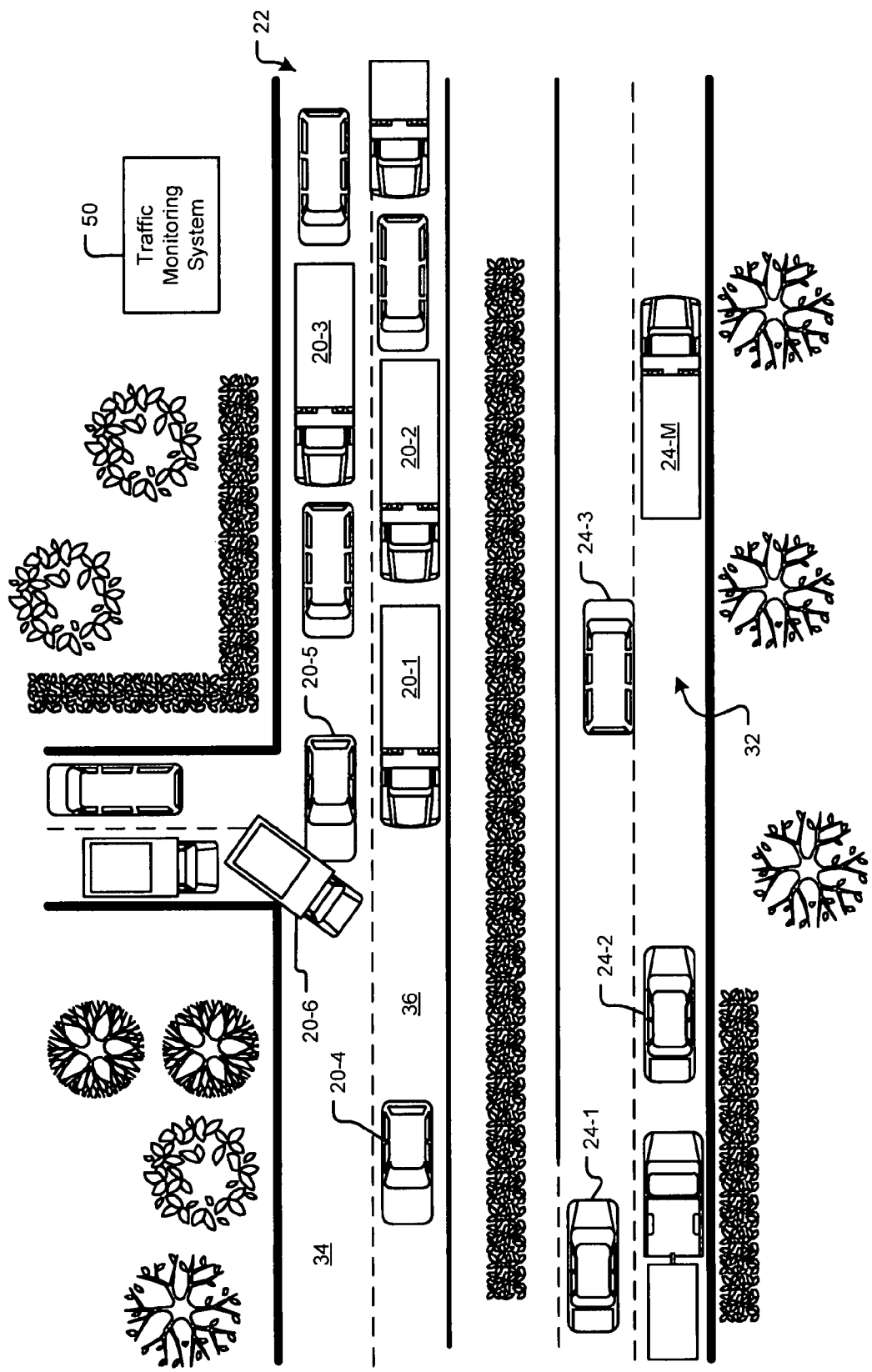
FIG. 1 illustrates an exemplary traffic monitoring system that monitors vehicle traffic according to the present invention.

The following description of the preferred embodiment(s) is merely exemplary in nature and is in no way intended to limit the invention, its application, or uses. For purposes of clarity, the same reference numbers will be used in the drawings to identify similar elements.

Referring now to FIG. 1, an exemplary traffic monitoring system that monitors vehicle traffic according to the present invention is shown. Vehicles 20-1, 20-2, . . . , and 20-N (generally identified as vehicles 20) travel on a road in a first direction generally identified at 22. Vehicles 24-1, 24-2, . . . , and 24-M (generally identified as vehicles 24) travel on the road in a second direction generally identified at 32. For example, vehicles 20-5 and 20-6 are involved in an accident, which slows the flow of traffic in the first direction 22. The accident does not slow traffic moving in the second direction 32. The traffic monitoring system alerts motorists of the slow traffic on the road traveling in the first direction, as well as information relating to traffic on other freeways, streets and other major thoroughfares.

The traffic monitoring system may further alert motorists of slow traffic in a specific lane of a road. For example, the accident involving the vehicles 20-5 and 20-6 is located in a first lane 34. The accident does not prevent travel in a second lane 36. The traffic monitoring system determines that the accident is located in the first lane 34 and may direct motorists to travel in the second lane 36 instead of the first lane 34 (i.e. direct motorists to change lanes to avoid the accident).

According to the present invention, some of the vehicles 20 and 24 include global positioning systems (GPS) that include receivers that triangulate vehicle position based on signals generated by GPS satellites. In addition, the GPS may include an integrated transmitter and/or transceiver that transmits vector and location data wirelessly to a traffic monitoring system 50, which is located remotely from the vehicles 20 and 24. Alternately, a separate transmitter and/or transceiver may be used in conjunction with a receiver-only GPS. The vector data may include speed and direction data. The location data may include longitude and latitude information or location information using another coordinate system. For example, the location data may indicate whether the vehicle is traveling in the first lane 34 or the second lane 36.

The traffic monitoring system 50 receives the vector and location data, performs calculations on the data and transmits traffic and/or parking information back to the vehicles 20 and 24 with GPS systems with integrated transmitters and/or transceivers and/or GPS systems with separate transmitters and/or transceivers as will be described further below. The GPS systems of the vehicles provide visual and/or audible traffic information to allow drivers to avoid traffic bottlenecks such as the accident and/or to find parking spots.

Figure 2A:
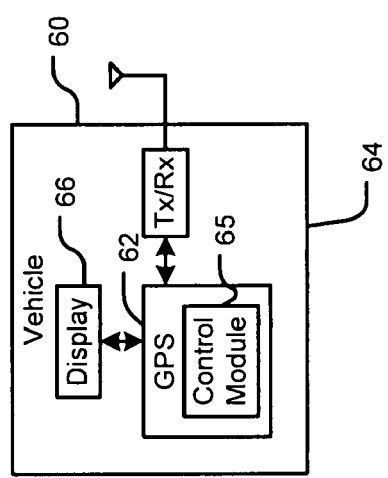
FIGS. 2A and 2B are functional block diagrams of exemplary vehicles including a GPS, a transceiver, a control module and a display.

Referring now to FIGS. 2A, 2B, 3A and 3B, several exemplary vehicle configurations are shown. While specific examples are shown, other configurations may be used. In FIG. 2A, a vehicle 60 includes a GPS 62, a wireless transceiver 64 and a display 66. A control module 65 that is integrated with the GPS 62 performs control functions relating to traffic and/or parking information systems. The GPS 62 triangulates position or location data of the vehicle 60 and calculates vector data using GPS signals generated by GPS satellites. The vehicle 60 selectively transmits the vector and location data wirelessly via the transceiver 64 to the remote traffic monitoring system 50. The transceiver 64 periodically receives traffic data from the remote traffic monitoring system 50 as will be described further below. The GPS systems 62 outputs traffic and other GPS-related information using the display 66. In some implementations, the transceiver 64 may be integrated with the GPS 62. As can be appreciated, the control module 65 may be separate from the GPS 62 as shown at 62' and 65' in FIG. 2B.

Figure 3A:
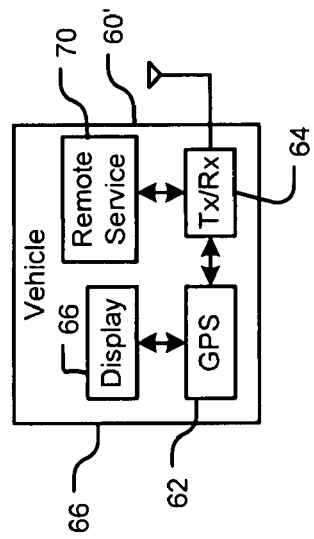
FIG. 3A is a functional block diagram of the exemplary vehicle of FIG. 2A with a remote service assistance (RSA) system.
Figure 2B:
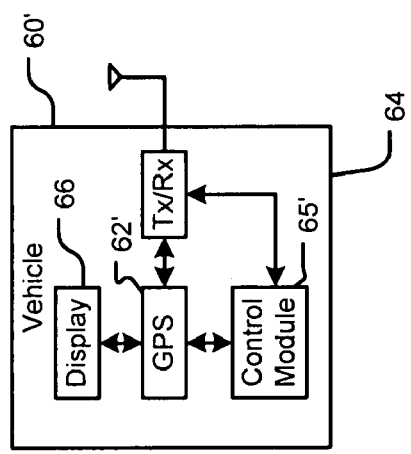

In FIG. 3A, a vehicle 60' that is similar to FIGS. 2A and 2B is shown and further comprises a vehicle-based remote service assistance system 70, which provides a connection to a main remote service assistance system and/or a service assistant. For example, one suitable remote service assistance system 70 is OnStar®, although other remote service assistance systems may be utilized. In FIG. 3A, the remote service assistance system 70 and the traffic monitoring system 50 share the common transceiver 64. In some implementations, the transceiver 64 may be integrated with the GPS 62 and/or the remote service system 70.

Figure 3B:
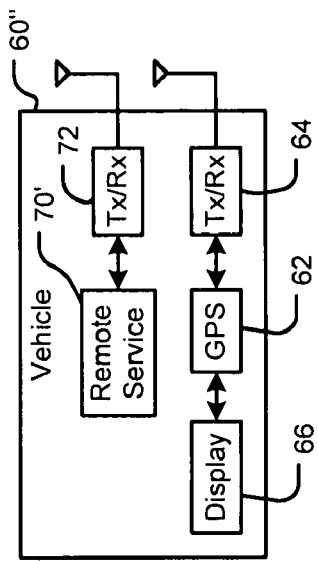
FIG. 3B is a functional block diagram of the exemplary vehicle of FIG. 2A with an alternate RSA system.

In FIG. 3B, a vehicle 60" that is similar to FIGS. 2A and 2B is shown and further comprises an alternate remote service assistance system 70'. In FIG. 3B, the remote service assistance system 70' utilizes a transceiver 72 that is separate from the transceiver 64 used by the GPS system 62. As can be appreciated, any suitable wireless systems may be employed including cellular systems, WiFi systems such as 802.11, 802.11a, 802.11b, 802.11g, 802.11n (which are hereby incorporated by reference), and/or other future 802.11 standards, WiMax systems such as 802.16 (which is hereby incorporated by reference) and/or any other suitable type of wireless system that allows communication over sufficient distances. In some implementations, one or both of the transceivers 64 and 72 are integrated with the GPS 62 and/or remote service system 70'. As in FIGS. 2A and 2B, the control module may be integrated with or separate from the GPS and/or other system components.

Figure 4:
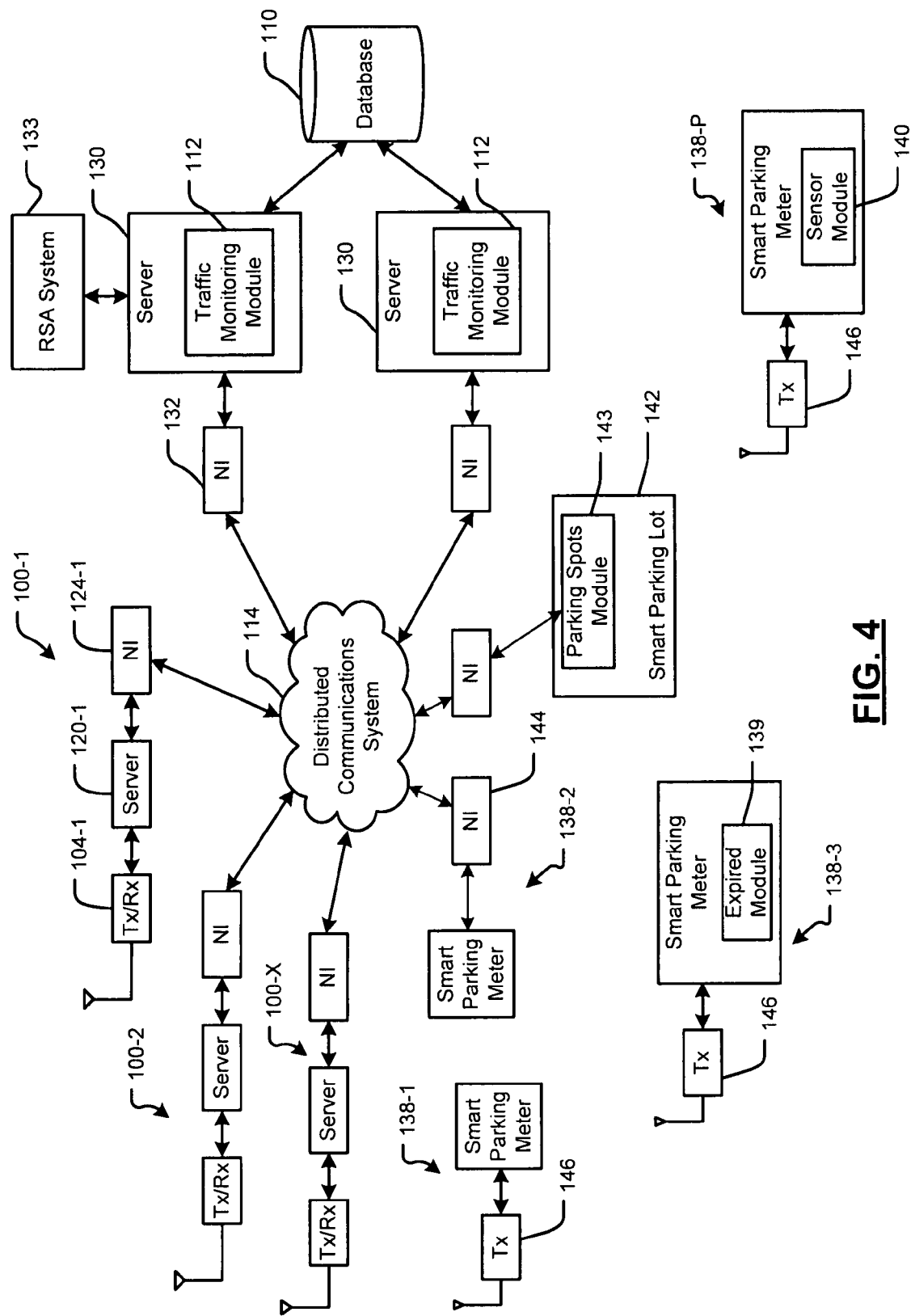
FIG. 4 is a functional block diagram of portions of an exemplary traffic monitoring system.

Referring now to FIG. 4, a functional block diagram of an exemplary traffic and/or parking monitoring system is shown. The traffic monitoring system includes a plurality of monitoring stations 100-1, 100-2, . . . , and 100-X (collectively monitoring stations 100) such as the traffic monitoring system 50 shown in FIG. 1. The parking information can be provided in addition to or separate from the traffic information. The monitoring stations 100 include a transceiver 104. The monitoring stations 100 receive vector and location data from the vehicles and transmit traffic and/or parking information to the vehicles as will be described. To that end, the monitoring stations 100 are connected to one or more databases 110 that store traffic and/or parking information. Traffic monitoring modules 112 analyze the data that is stored in the databases 110.

While the present invention will be described in conjunction with a distributed communications system 114, there are many other suitable ways of interconnecting the monitoring stations 100. The monitoring station 100-1 includes a server 120-1 and a network interface (NI) 124-1. The NI 124-1 provides a connection to the distributed communications system 114. In some implementations, the distributed communications system 114 includes the Internet, although any other type of network may be used. The databases 110 may also be connected to the distributed communications system 114 by servers 130 via NI 132. Other types of interconnection include dedicated phone lines, terrestrial links, satellite links and/or other suitable links may be used. The main RSA system 133 may communicate with one or more of the servers 130 and/or may have all independent links via the DCS 114. The system may use an inquiry response technique and/or a push technique for providing parking and/or traffic information.

In addition to the foregoing, a plurality of smart parking meters 138-1, 138-2, . . . , and 138-P (collectively smart parking meters 138) can be provided. The smart parking meters 138 provide an indication when the parking spot is filled or vacant. In some implementations, the smart parking meter 138 may make this decision based on a meter status signal generated by an expired module 139. The expired module generates the meter status signal having a spot filled state when the meter is running. The meter status signal has a spot vacant state when the meter expires. In other words, when the meter is expired, the smart parking meter can assume that the spot is vacant.

Alternately, the smart parking meter 138 may include a sensor 140 that senses whether a vehicle is located in a corresponding parking spot. In some implementations, the sensor outputs a radio frequency signal in a direction towards the parking space and generates the meter status signal depending on reflected signals that are received. If the reflected signals are returned in a period less than a threshold and/or have an amplitude greater than a threshold, a vehicle is in the spot. If not, the spot is vacant. In some implementations, the reflected signals need to be less than the threshold for a predetermined period (to reduce noise). In still other embodiments, a group of meters may include a common sensor that senses the presence of one or more vehicles in one or more parking spots of the group. In addition, a parking lot 142 may include a parking spot module 143 that provides a collective signal that K parking spots are available in the entire parking lot 142. The smart parking meters 138 and smart parking lots 142 may be connected to the traffic monitoring system in any suitable manner including network interfaces (NI) 144, wireless transmitters 146 and/or in any other suitable manner. When transmitting the information, wireless or wired connections may be used.

Figure 5:
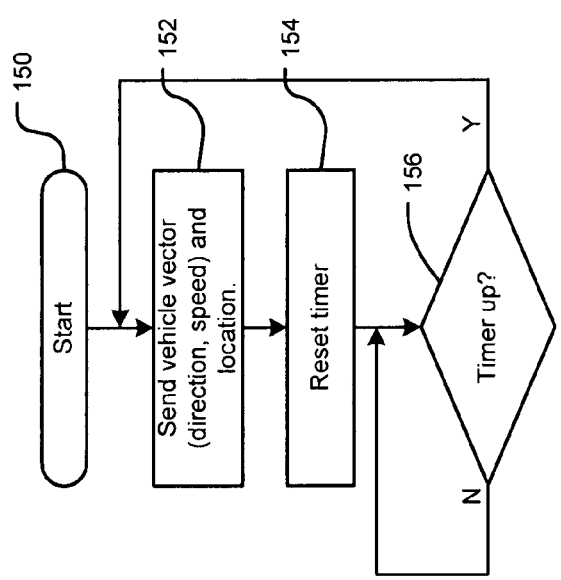
FIG. 5 is a flow chart illustrating exemplary steps performed by a vehicle for transmitting data.

Referring now to FIG. 5, a flow chart illustrating exemplary steps performed by systems associated with the vehicle are shown. In this exemplary embodiment, the vehicle sends vehicle vector and location data on a periodic basis. The data transmission may be selectively enabled while the vehicle ignition is on, the vehicle ignition is on or off, the vehicle is moving and/or using other criteria. Control begins with step 150. In step 152, the vehicle sends vector and location data. In step 154, a timer is reset. In step 156, control determines whether a timer is up. If false, control returns to step 156. If step 156 is true, control returns to step 152. Control may be performed by the GPS system 62 or using any other control module in the vehicle. Alternately and/or in addition to the foregoing, the traffic monitoring system may periodically query the vehicle remotely for vector and/or location data. The vehicle responds to the query by sending the vector and/or location data.

Figure 6:
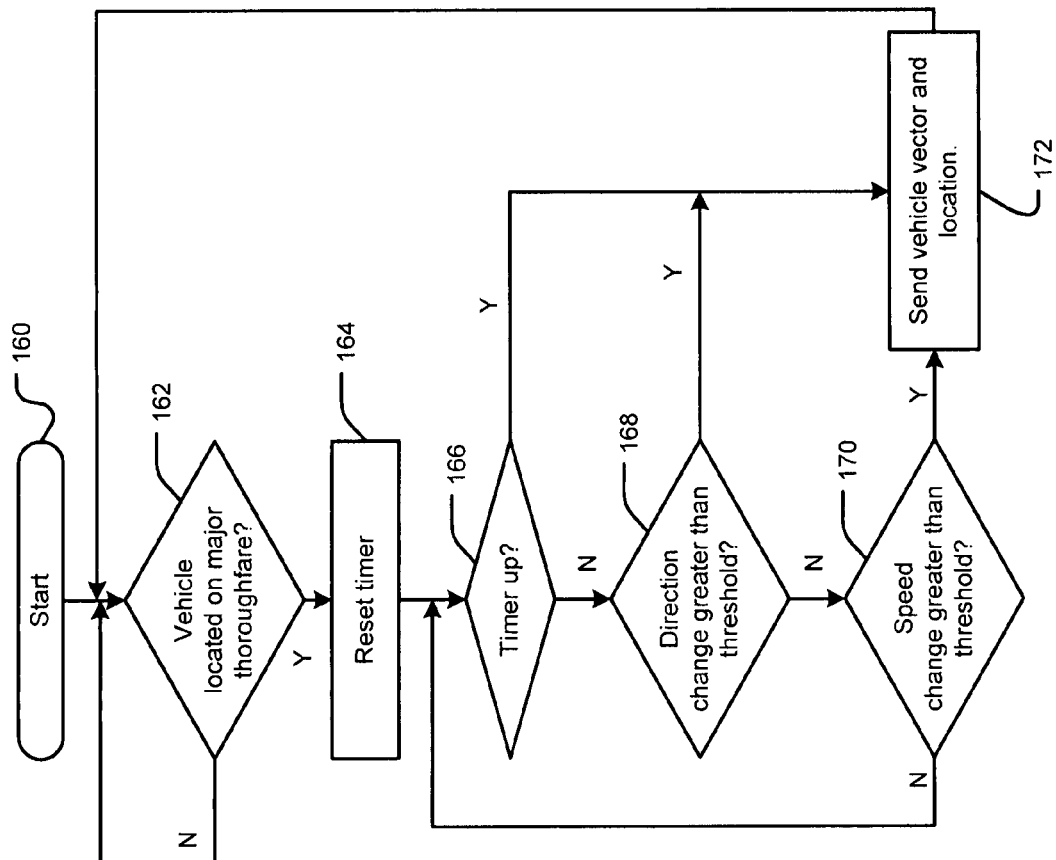
FIG. 6 is a flow chart illustrating first alternate exemplary steps performed by a vehicle for transmitting data.

Referring now to FIG. 6, a flow chart illustrating exemplary steps performed by systems associated with the vehicle are shown. Control begins with step 160. In step 162, control determines whether the vehicle is located on a major thoroughfare. For example, major thoroughfares may be defined to include freeways, highways and major streets. Major thoroughfares may exclude smaller streets, residential areas and low traffic streets to reduce the amount of data being sent. Since traffic is low on these types of roads, traffic information is not needed. If step 162 is false, control returns to step 162. If step 162 is true, control resets a timer in step 164. In step 166, control determines whether a timer is up. If not, control continues with step 168 and determines whether the vehicle has a direction change that is greater than a first threshold. If not, control continues with step 170 and determines whether the vehicle has incurred a speed change that is greater than a second threshold. Steps 166, 168 and 170 also tend to limit data being transmitted by the vehicle to the traffic monitoring system. One or more of these steps may be performed.

Figure 7B:
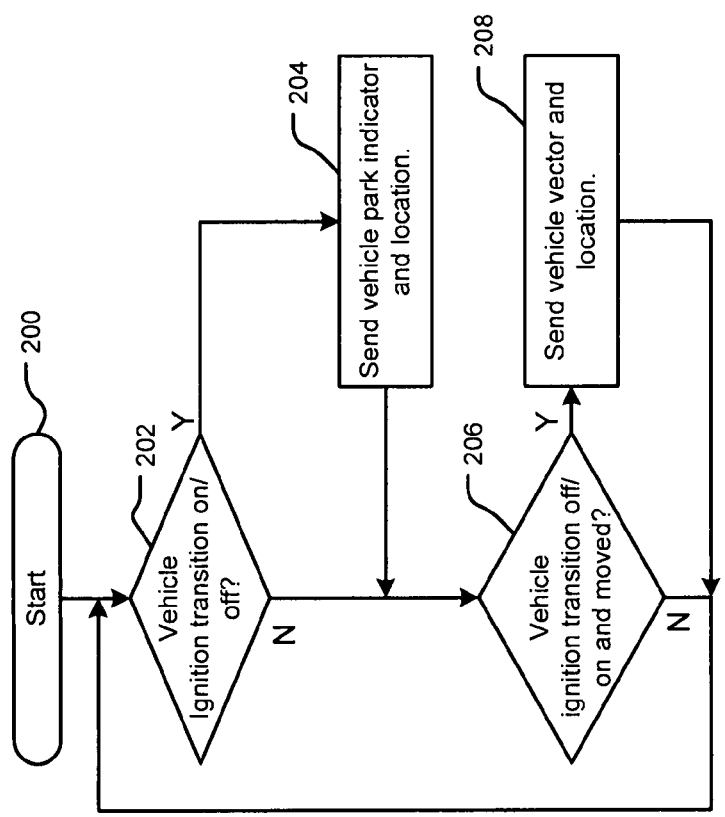
FIG. 7B is a flow chart illustrating alternate exemplary steps performed by the traffic monitoring system for transmitting parking-related data.
Figure 7A:
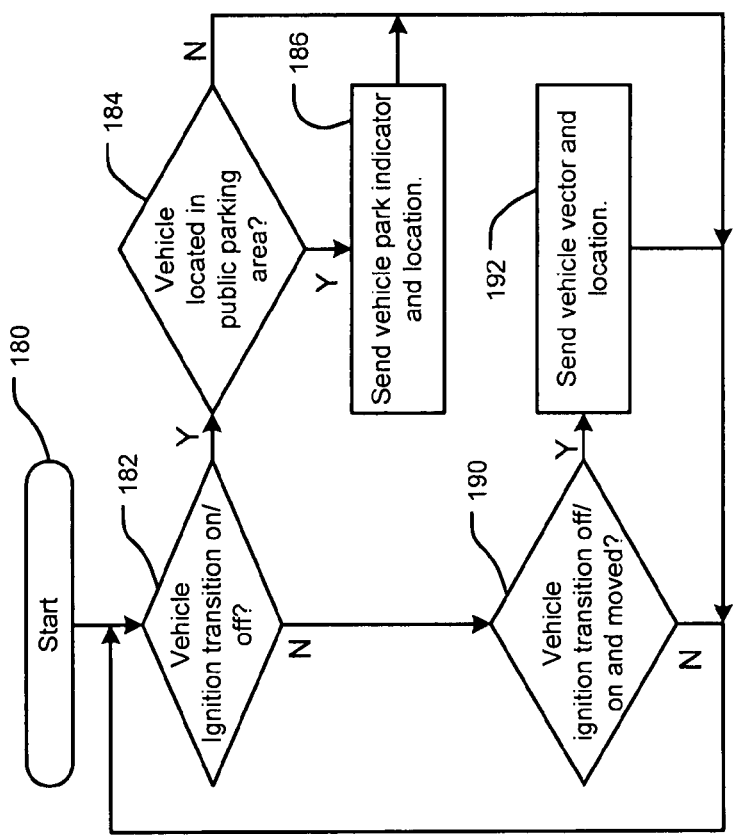
FIG. 7A is a flow chart illustrating exemplary steps performed by the traffic monitoring system for transmitting parking-related data.

Referring now to FIG. 7A, a flow chart illustrating exemplary steps performed by the traffic monitoring system is shown. Control begins with step 180. In step 182, control determines whether the vehicle ignition transitions from on to off. If true, control determines whether the vehicle is located in a public parking area in step 184. This step may be performed by the vehicle alone and/or by the vehicle transmitting location information to the traffic monitoring system and receiving a response indicating whether the location is a parking spot in a public parking area. If step 184 is true, the vehicle sends a park indicator and location data in step 186. Control continues from step 186 to step 182. If step 184 is false, control returns to step 182. Therefore, the traffic monitoring system receives data related to parked vehicles.

If step 182 is false, control continues with step 190 and control determines whether the vehicle ignition transitions from off to on and the vehicle is moved. When the ignition turns on, it is likely that the vehicle may exit the parking space. If step 190 is true, control sends vehicle vector and location data to the traffic monitoring system in step 192 and control returns to step 182. If step 190 is false, control also continues with step 182. The traffic monitoring system uses the vehicle parking and vehicle leaving data to provide parking information to other vehicles.

Referring now to FIG. 7B, a flow chart illustrating alternate exemplary steps performed by the traffic monitoring system are shown. Control begins with step 200. In step 202, control determines whether the vehicle ignition transitions from on to off. If step 202 is true, control sends vehicle park indicator and location data in step 204 and as described above. If step 202 is false, control continues with step 206. In step 206, control determines whether the vehicle ignition transitions from off to on and the vehicle is moved. If true, control sends vehicle vector and location data. If step 206 is false, control returns to step 202.

Figure 8:
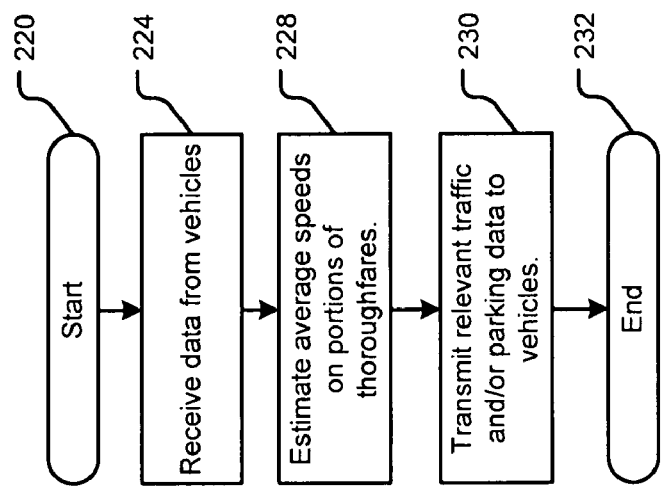
FIG. 8 is a flow chart illustrating steps performed by the traffic monitoring system for receiving and processing traffic and parking data.

Referring now to FIG. 8, a flow chart illustrating data collection and analysis steps performed by the traffic monitoring system are shown. Control begins with step 220. In step 224, control receives data from the vehicles. In step 228, control estimates average speeds on selected portions of thoroughfares based on data from one or more vehicles. For example, the traffic monitoring system may estimate average speeds for predetermined distances or increments, and/or for specific lanes. The traffic monitoring system may also compare average speeds of different lanes. The increments may vary based on road type, conditions or calculated speeds. For example, as the difference between the average speeds and the posted speeds differ, the predetermined increment may be reduced in length.

Traffic information is transmitted to the vehicles based upon calculations made on the collected vehicle data. The traffic information may be pushed to the vehicles and/or an inquiry/response technique may be used in step 230. Control ends in step 232. In addition to traffic information, parking data may also be transmitted to the vehicles using a push technique and/or an inquiry/response technique.

The traffic monitoring system may perform the analysis steps based in part on a sample size of data collected from the vehicles. The traffic monitoring system generates a confidence level that is associated with the traffic information that is transmitted to the vehicles based on the sample size. For example, the traffic monitoring system may only receive data from a single vehicle or a number of vehicles below a threshold in a particular area. When data from the single vehicle indicates that the vehicle is traveling at a speed above a certain threshold, the traffic monitoring system can presume that other vehicles in the vicinity are traveling at similar speeds and generate a high confidence level.

Conversely, the data from the single vehicle may indicate that the vehicle is not moving or traveling below the threshold. The slow traveling speed may not necessarily indicate that the other vehicles in the vicinity are traveling at similar speeds. For example, the single vehicle may be stopped or slowed because of vehicle problems. When only a single vehicle or a low number of vehicles are stopped or traveling at a low speed, the traffic monitoring system generates a low confidence level to associate with the traffic information. The traffic monitoring system may flag the single vehicle to consider the prior data in subsequent confidence analyses.

Figure 9:
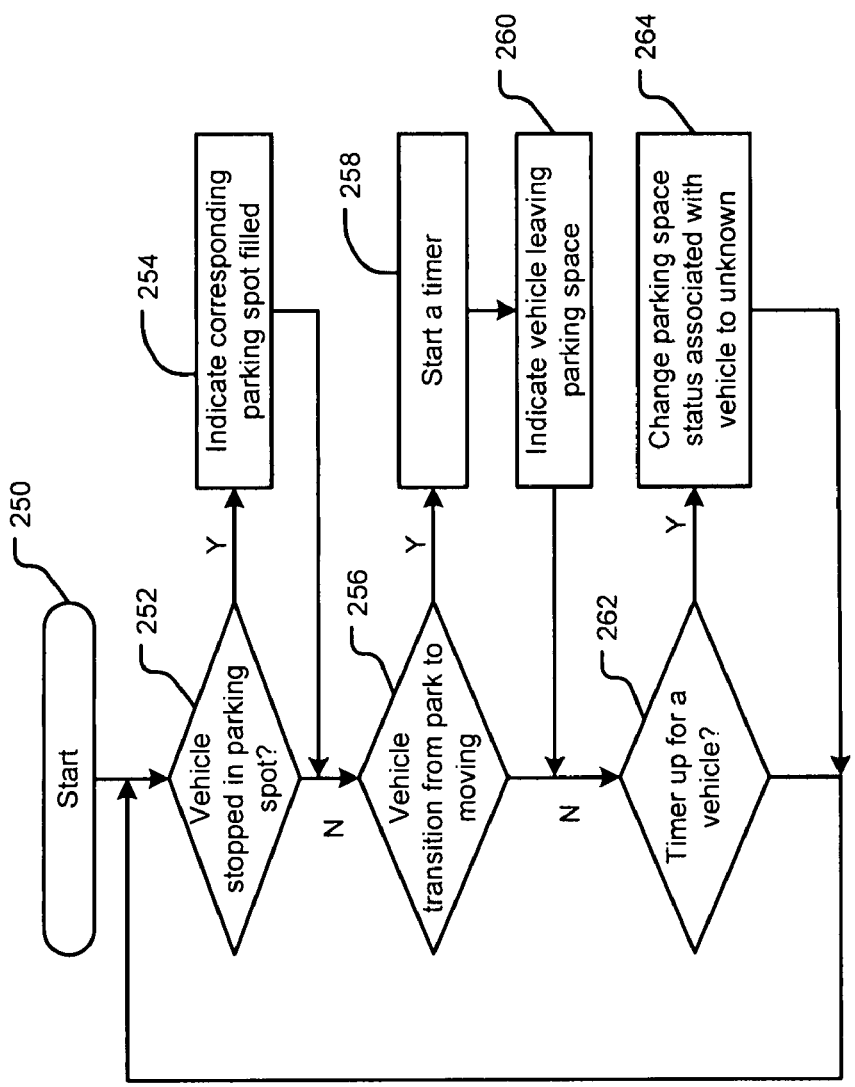
FIG. 9 illustrates steps performed by the traffic monitoring system for monitoring parking.

Referring now to FIG. 9, steps performed by the traffic monitoring system for monitoring parking are illustrated. Control begins with step 250. In step 252, control determines whether a vehicle is stopped in a public parking spot. The decision may be based on vector and location data samples and/or based on a parking indicator and location data. The determination that the parking spot is a public spot is based on the location data. If true, control indicates that the corresponding public parking spot is filled in step 254.

Control continues from steps 252 and 254 with step 256. In step 256, control determines whether a vehicle transitions from parking to moving. If step 256 is true, control starts a timer in step 258. In step 260, control indicates that a vehicle is leaving a public parking space. The timer is used to limit the amount of time that the parking space is identified as "vehicle leaving". Control continues from steps 256 and 260 with step 262. In step 262, control determines whether a timer for a vehicle is up. If step 262 is true, control changes a status of the parking space to unknown in step 264. Control continues from steps 262 and 264 with step 252.

Figure 10:
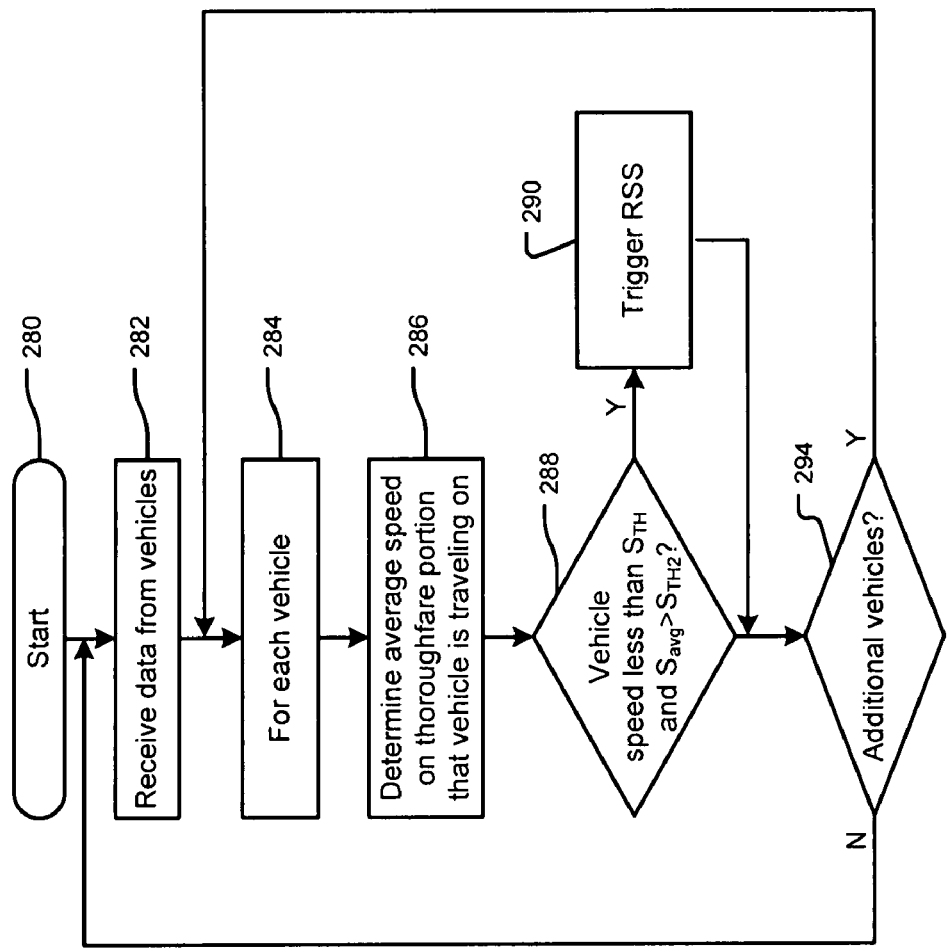
FIG. 10 illustrates steps performed by the traffic monitoring system and the RSA system for identifying vehicles having operational problems.

Referring now to FIG. 10, steps performed by the traffic monitoring system for identifying vehicles having operational problems are shown. Control begins with step 280. In step 282, control receives data from vehicles. In step 284 and 286, for each of the vehicles, control determines an average speed on a thoroughfare portion and lane that the vehicle is traveling on. In step 288, control determines whether the speed of each vehicle is less than a first speed threshold and the average speed on a thoroughfare is greater than a second speed threshold.

For example, if the average speed on a thoroughfare is 50 mph and the speed of the vehicle is less than 5 mph, the vehicle may be having operational problems and/or may have been involved in an accident and require assistance. Frequent speed changes and/or lane changes (e.g., lane changes greater than a lane change frequency threshold) may indicate other operational problems such as driver impairment. If step 288 is true, control triggers an inquiry via the remote service assistance system in step 290. For example, the traffic monitoring system notifies the main remote service assistance system to have a service assistant contact the driver of the vehicle. The service assistant can determine whether or not there is a problem such as an accident or other operational problem and contact emergency personnel, roadside assistance and/or other assistance as needed. For example, the service assistant may notify the emergency personnel of a location of the vehicle, including the thoroughfare portion and the lane that the vehicle is traveling in. Control continues from step 288 and 290 with step 294. In step 294, control determines whether there are additional vehicles to evaluate. If step 294 is true, control returns to step 284. If step 294 is false, control returns to step 282.

Figure 11:
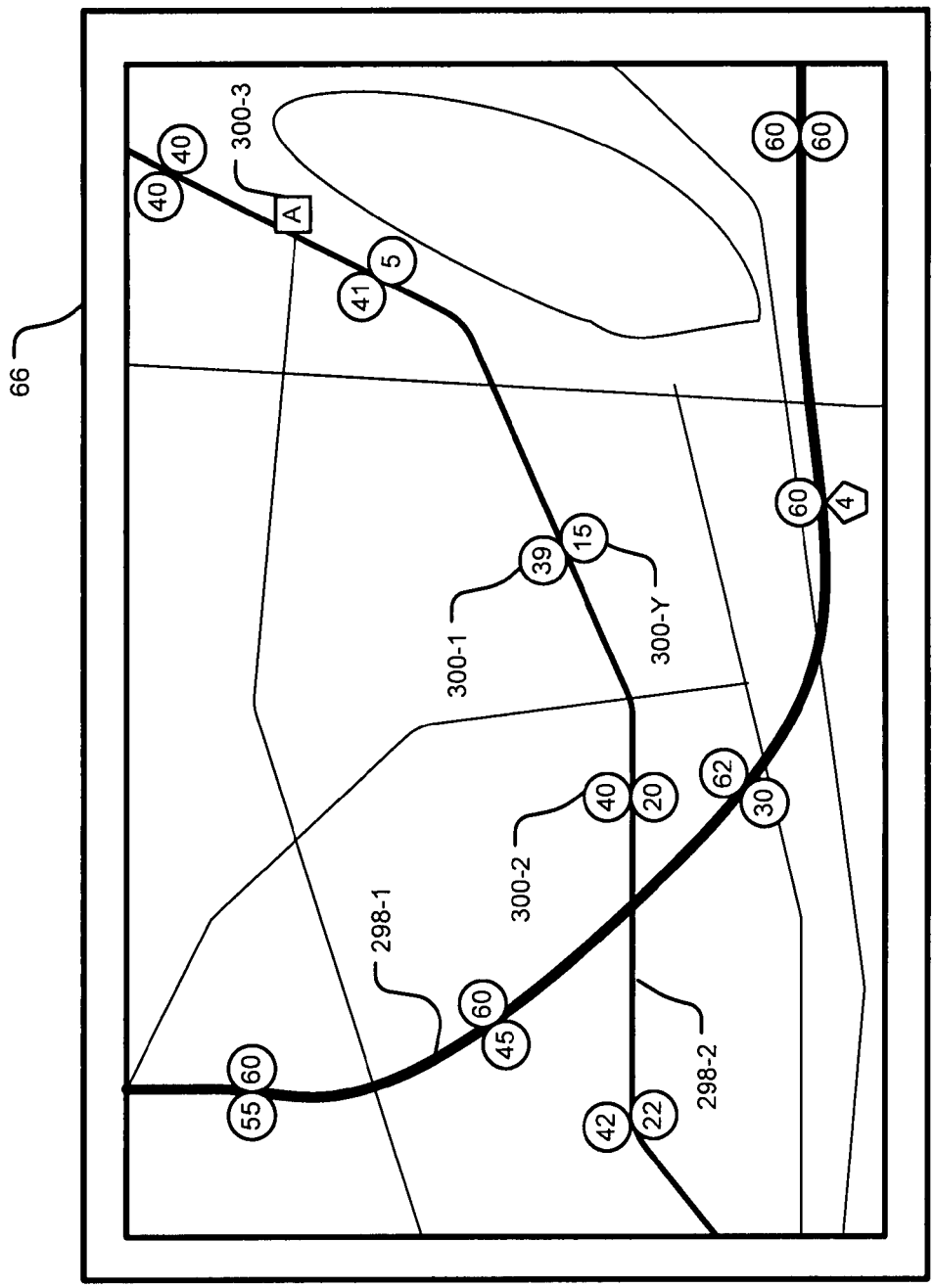
FIG. 11 illustrates an exemplary map display with average vehicle speeds on roads, accidents, construction and/or other items.

Referring now to FIG. 11, a display illustrating vehicle speeds on thoroughfares 298-1, 298-2, . . . and 298-Z is shown. The display 66 associated with the GPS system at 62 is shown. Visual elements generally identified by 300-1, 300-2, . . . , and 300-Y are provided on the map. The visual elements indicate bottlenecks and/or other traffic on the main thoroughfares. Any suitable visual indication may be used to identify problems. For example, color, cross-hatching, shading, shapes, blinking and/or other techniques may be used to identify high traffic zones, low speed zones, construction zone, and/or accident zones. For example, visual element 300-3 may be rendered in red and flashing to signify an accident. Speeds on the thoroughfare also provide an indication of a problem (e.g. the speeds decrease as the distance to the accident 300-3 decreases).

Figure 12:
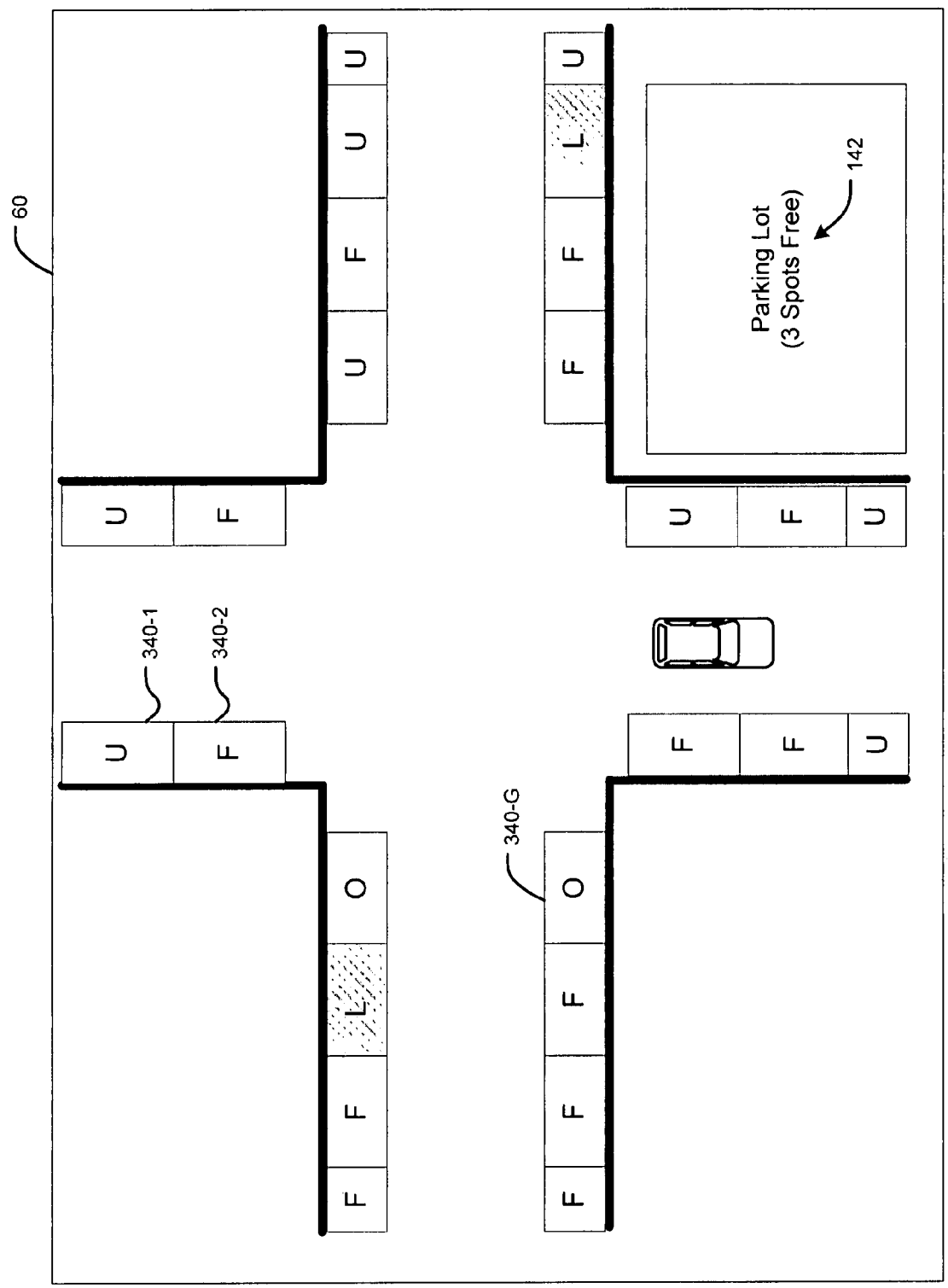
FIG. 12 illustrates an exemplary display of available parking in the vicinity of the vehicle.

Referring now to FIG. 12, an exemplary display of available parking in the vicinity of the vehicle is shown. Based on information collected, the display of the GPS 62 can be used to identify available parking spaces 340-1, 340-2, . . . , and 340-G in a selected area. The traffic monitoring system may provide filled (F), leaving (L), open (O) and/or unknown (U) status data for parking spaces in a selected area. These indicators may be designated using any suitable visual indication.

The filled indicator is used when a vehicle with the GPS system parks in the spot and the traffic monitoring system does not receive data indicating that the vehicle has moved. The unknown indicator is used when there is no information concerning the space and/or after a predetermined amount of time after a vehicle with a GPS system leaves a parking spot. A leaving indicator is used within a predetermined time after a vehicle with a GPS system leaves a parking spot. The leaving indicator may also be triggered when a vehicle with a GPS system starts its engine after a dwell period. The open status is used when the space is open. In some implementations, the status is provided by smart parking meters 138. Spaces in smart parking lots 142 may also be shown at 342.

Figure 13B:
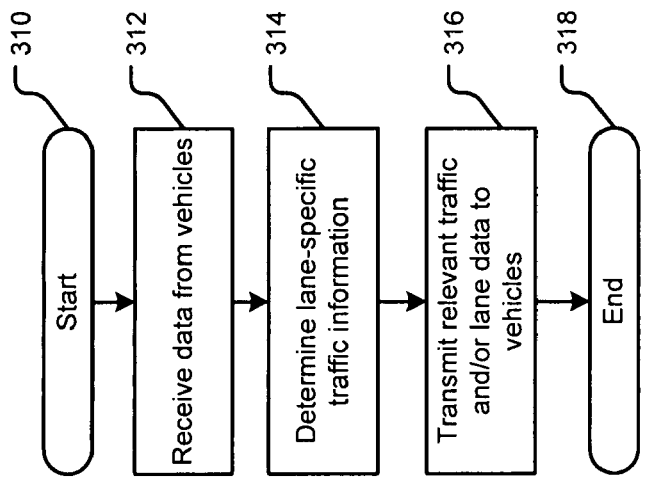
Figure 13A:
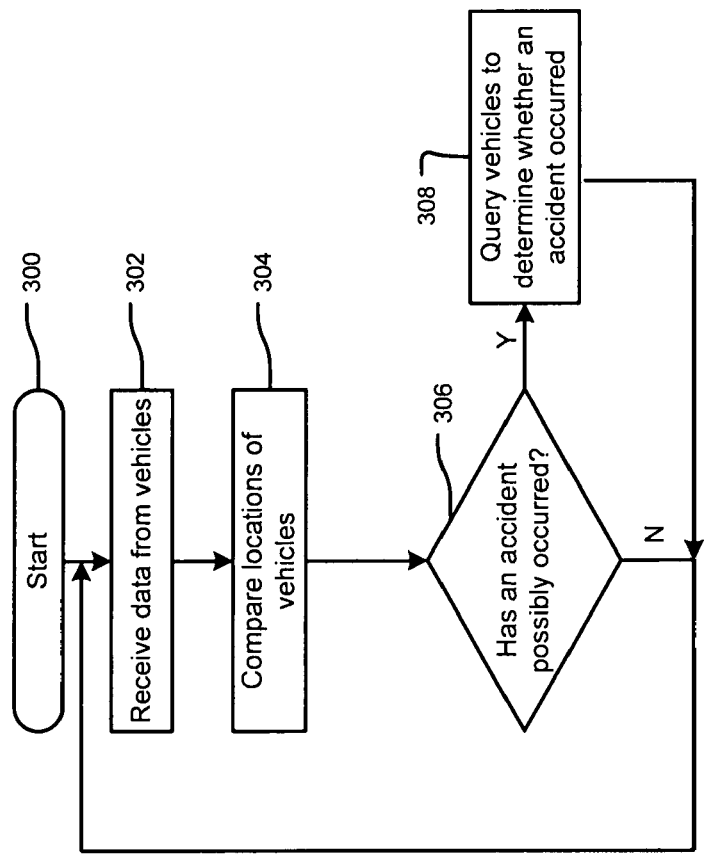
FIG. 13A illustrates steps performed by the traffic monitoring system to identify possible vehicle accidents.

Referring now to FIG. 13A, steps for identifying accidents are shown. Control begins in step 300. In step 302, the traffic monitoring system receives data from vehicles. In step 304, the traffic monitoring system compares locations of the vehicles at the same time. Based on the location and time, the traffic monitoring system can determine whether an accident may have occurred. If the vehicles have substantially the same location at the same time, the traffic monitoring system may query the users to determine whether an accident has occurred in step 308. In other words, if two vehicles provide their location at a particular time and the locations conflict, the traffic monitoring system may assume that there is a possibility that an accident occurred and take action via the remote service assistance system. The traffic monitoring system can also determine which lane the accident occurred in and which lanes the accident is blocking.

Referring now to FIG. 13B, steps for updating traffic information based on lanes that vehicles are traveling in are shown. Control begins in step 310. In step 312, the traffic monitoring system receives data from vehicles. In step 314, the traffic monitoring system determines lane-specific traffic information based on the data. For example, the traffic monitoring system determines which lanes of a particular thoroughfare that vehicles are traveling in based on the data. The traffic monitoring system can determine average speeds of vehicles and accident locations in specific lanes. The traffic monitoring system can further determine lane changes and lane change frequency based on the data. For example, when an accident is located in a first lane, the data may indicate that a plurality of vehicles are changing from the first lane to a second or third lane. The data may also indicate that vehicles are changing lanes to avoid a non-vehicle obstruction in a lane, such as a pothole or vehicle debris.

In step 316, the traffic monitoring system notifies vehicles of the traffic information and/or the vehicle requests the traffic information using an inquiry/response technique. In addition to the traffic information, the traffic monitoring system may transmit suggested lane changes to the vehicle to avoid accidents and/or lane obstructions. Control ends in step 318.

Figure 14:
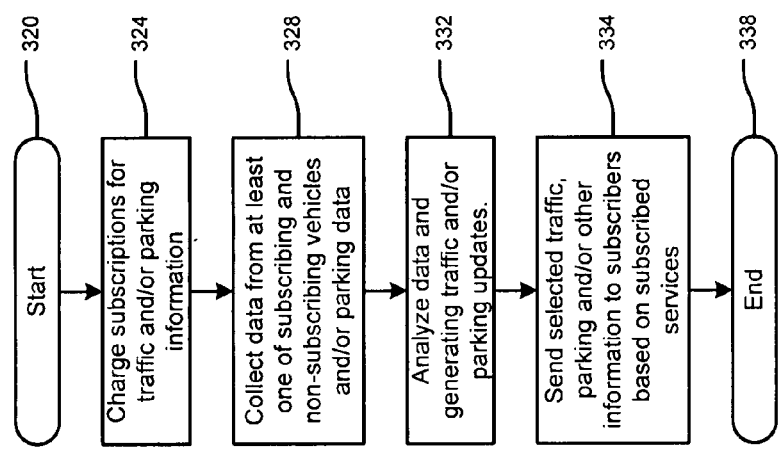
FIG. 14 illustrates steps performed by an exemplary traffic and/or parking information subscriber system.

Referring now to FIG. 14, a subscriber service according to the present invention is shown. Control begins in step 320. In step 324, fees are charged for subscription services. The fees can be based on the level of service that is requested. In step 328, data is collected from at least one of subscribing and non-subscribing vehicles and/or from smart parking meters and/or lots. In some implementations, data from other subscriber systems may be used. In step 332, data is analyzed and traffic, parking and other information is generated. In step 334, selected traffic, parking and/or other information is sent to subscribers based on subscribed services of the user. For example, some users may pay a subscription fee to receive traffic information but not parking information. Other subscribers may receive either parking information only or traffic and parking information. The subscriber levels may also be differentiated based on geography, time of day and/or using other criteria. Control ends in step 338.

Figure 15:
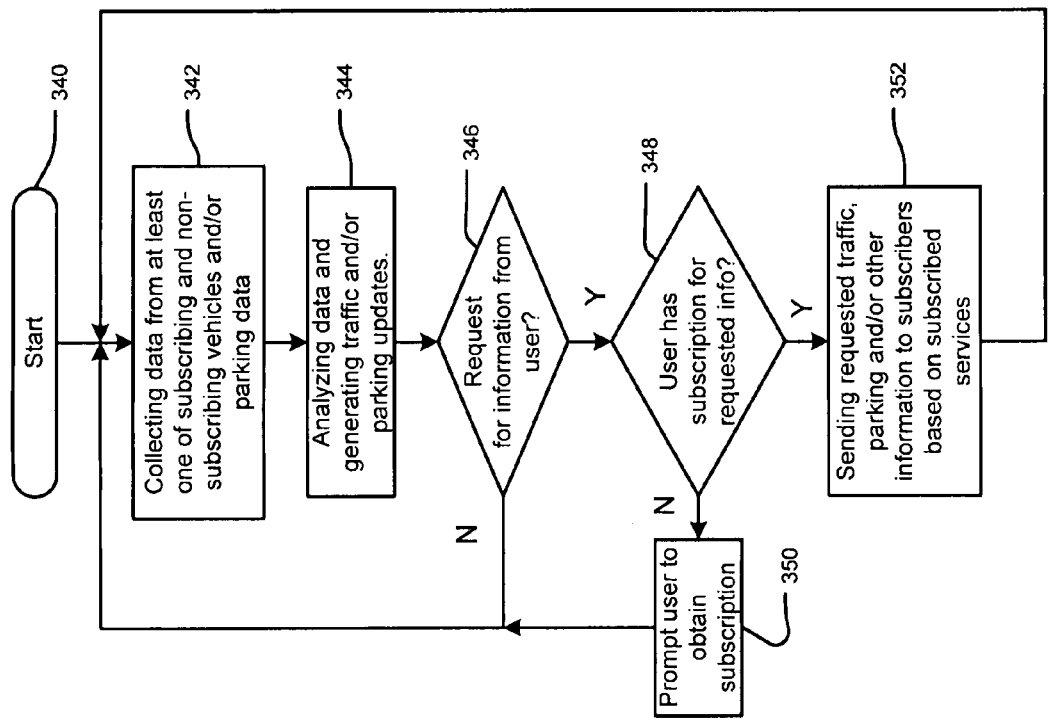
FIG. 15 illustrates steps performed by another exemplary traffic and/or parking information subscriber system.

Referring now to FIG. 15, another exemplary subscriber service according to the present invention is shown. Control begins in step 340. In step 342, data is collected from at least one of subscribing and non-subscribing vehicles and/or from smart parking meters and/or lots. In step 344, data that is collected is analyzed and traffic, parking and other information is updated. In step 346, control determines whether a request for information is received. Alternately, the information can be pushed to the user based on the subscription of the user. If step 346 is false, control returns to step 342. If step 346 is true, control determines whether the user has a subscription for the requested information. If false, control prompts the user to obtain a subscription. The subscriptions can be on a periodic basis, a pay-per-use basis or on any other basis. If step 348 is true, the requested information is sent to the subscriber. As can be appreciated, encryption and/or other techniques may be used to prevent fraudulent access to the traffic and/or parking information.

Figure 16A:
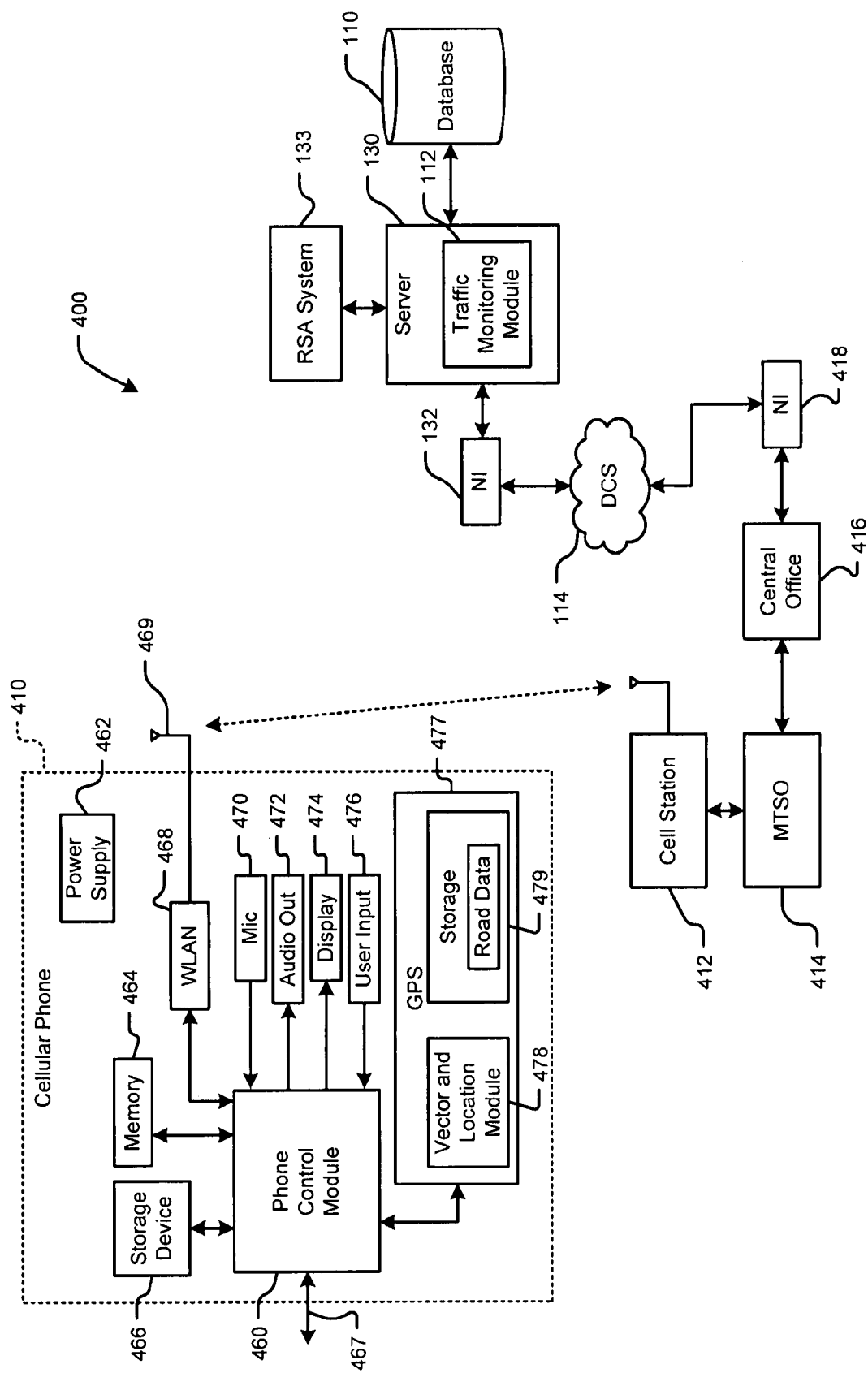
FIGS. 16A-16C are functional block diagrams of portions of an exemplary traffic monitoring system that employs data from cellular phones.
Figure 16B:
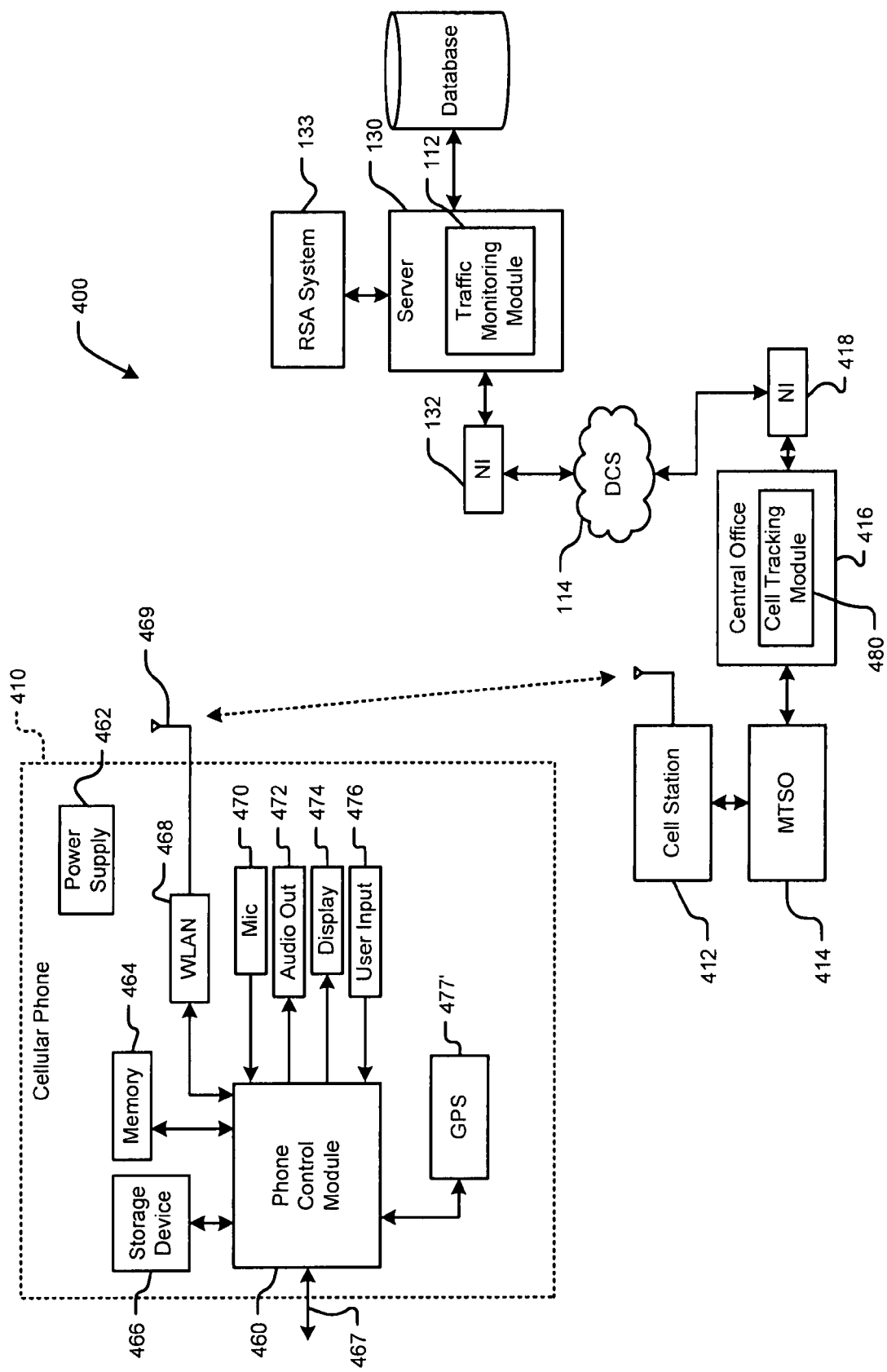
Figure 16C:
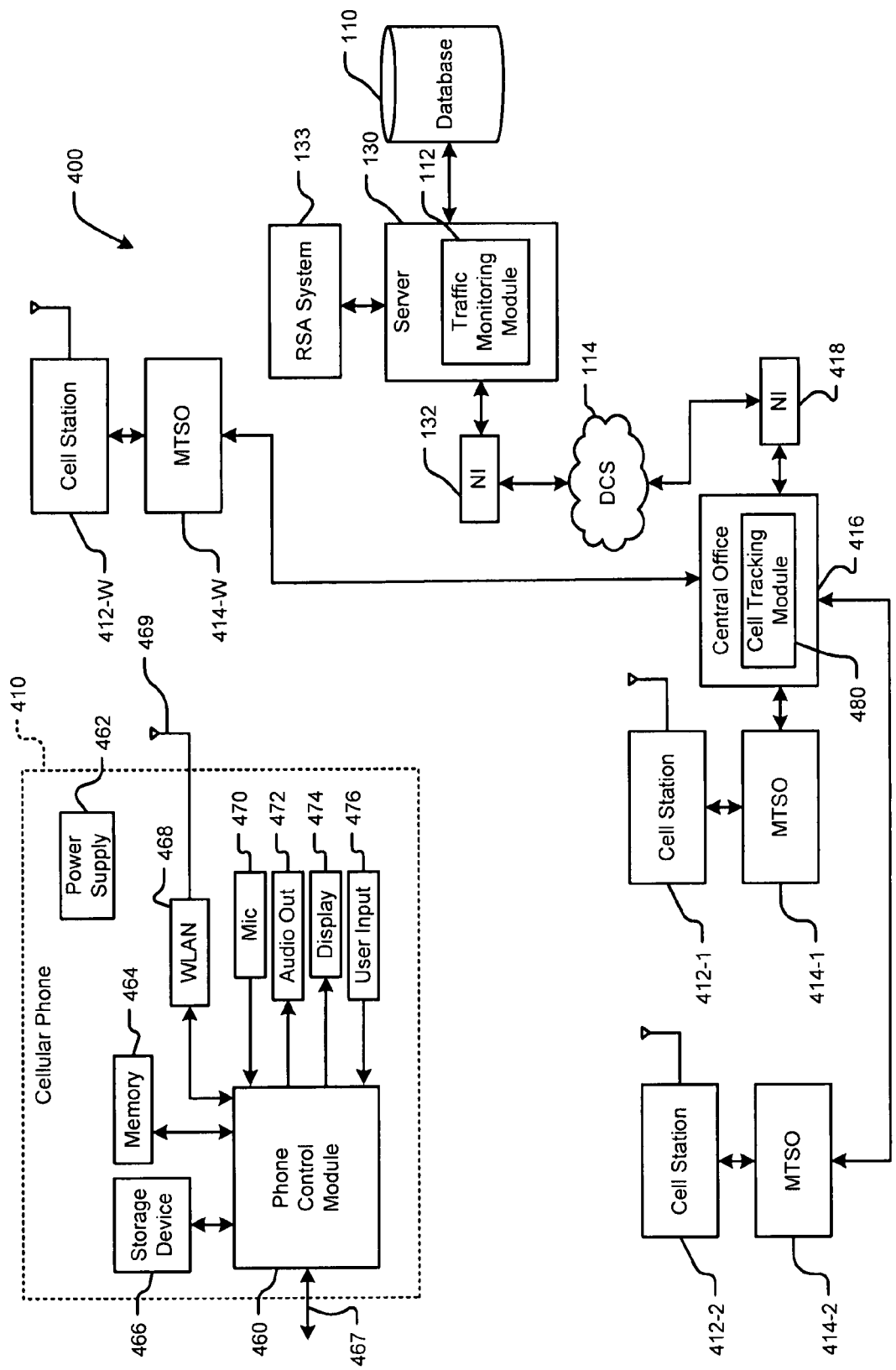

Referring now to FIGS. 16A-16C, exemplary traffic monitoring systems 400 that employ vector and location data from cellular phones 410 in addition to and/or instead of vector and location data from vehicles is shown. The location of the cellular phones 410 may be determined based on triangulation calculations and/or based on global positioning systems (GPS) that are integrated with the cellular phones.

In FIGS. 16A-16C, reference numbers from FIG. 4 are used to identify similar elements. The cellular phones 410 communicate with cellular stations 412. The cellular stations 412, in turn, communicate with a mobile telephone switching office (MTSO) 414. The MTSO 414 communicates with a central office 416. The central office 416 may communicate via a network interface 418 and the distributed communications system (DCS) 114 with the traffic monitoring module 112.

The network interface 418 may include any suitable connection to the network interface 132 associated with the traffic monitoring module 112. For example, the network interface 418 may include a server and broadband modem, a dedicated communication link such as a T1 line, and/or any other suitable link.

The cellular phone 410 includes a phone control module 460, a power supply 462, memory 464, a storage device 466, and a cellular network interface 467. The cellular phone 410 may include a WLAN interface 468 and associated antenna 469, a microphone 470, an audio output 472 such as a speaker and/or output jack, a display 474, and a user input device 476 such as a keypad and/or pointing device.

The phone control module 460 may receive input signals from the cellular network interface 467, the WLAN interface 468, the microphone 470, and/or the user input device 476. The phone control module 460 may process signals, including encoding, decoding, filtering, and/or formatting, and generate output signals. The output signals may be communicated to one or more of memory 464, the storage device 466, the cellular network interface 467, the WLAN interface 468, and the audio output 472.

Memory 464 may include random access memory (RAM) and/or nonvolatile memory such as flash memory, phase change memory, or multi-state memory, in which each memory cell has more than two states. The storage device 466 may include an optical storage drive, such as a DVD drive, and/or a hard disk drive (HDD). The power supply 462 provides power to the components of the cellular phone 410.

In FIG. 16A, the cell phone 410 includes a GPS module 477, which may include a vector and location module 478 that generates vector and location data in a manner similar to that described above with respect to the vehicle systems. The GPS module 477 may further include a storage device 479 that includes road identification data that identifies roads, stores maps and/or classifies roads in a manner similar to that described above with respect to the vehicle systems.

When the cell phone 410 is on, the GPS module 477 selectively generates vector and location data and transmits the data to the central office 416 via the cellular station 412 and the MTSO 414. The GPS module 477 may selectively send the vector and location data when the cellular phone 410 is traveling at a speed above a first speed threshold. Alternatively, the GPS module 477 may send the vector and location data periodically, on an event basis and/or using any other criteria. The first speed threshold may be set equal to a value that is greater than a typical speed of a person walking or running.

For example only, the threshold may be set equal to approximately 4 or 5 miles per hour to eliminate people walking with their cell phones. Additional higher thresholds such as 10-15 miles per hour can be used instead of or in addition to the lower threshold. If multiple thresholds are employed, the speed may be assigned a measure of certainty. In other words, when the cellular phone is moving at 9 miles per hour, it is fairly certain that the cellular phone is not being carried by a person walking. However, it may be carried by a person running. A higher threshold such as 15 miles per hour may be used to eliminate people who are running. Other thresholds may be used. Furthermore, the accuracy of GPS may be sufficient to differentiate between a cellular phone moving on the road as compared to a cellular phone moving on an adjacent sidewalk.

The GPS module 477 may also use the road identification information in the storage device 479 to selectively determine whether or not the vehicle (transporting the person with the cellular phone 410) is traveling on first type of road rather than a secondary road that is not being monitored. The GPS module 477 may also be used to selectively determine whether or not a speed of the cellular phone 410 is greater than the first speed threshold.

In FIG. 16B, the cellular phone 410 may include a more basic GPS module 477'. In this implementation, the GPS module 477' sends the location of the cellular phone 410 without checking the road identification information, comparing the traveling speed of the cellular phone to a threshold, and/or checking whether the cellular phone is traveling along a first type of road. The GPS module 477' may send the data periodically, on an event basis and/or using any other criteria. The GPS module 477' may send location data and not vector data.

The MTSO 414, the central office 416 and/or other component associated with the cellular system may include a cellular phone tracking module 480 that checks the road identification information, compares the traveling speed of the cellular phone to a threshold, and/or checks whether the cellular phone is traveling along a first type of road. The cellular phone tracking module 480 may also calculate speed. The cellular phone tracking module 480 may selectively send the vector and location data based on criteria set forth herein. Alternately, the cellular phone tracking module 480 can be associated with the traffic monitoring module 112 and the location data can be sent from the cellular phone 410 to the traffic monitoring module 112 for processing.

In FIG. 16C, the cellular phone 410 does not include a GPS module. Rather, multiple cell stations 412-1, 412-2, . . . and 412-W may use triangulation methods and/or signal strength methods to identify and track movement of the cellular phone 410. The cellular phone tracking module 480 may be associated with the MTSO 414 and/or the central office 416. The cellular phone tracking module 480 generates vector and location data for the cellular phone 410 based on the triangulated location data. The cellular phone tracking module 480 may also check the road identification information, compare the traveling speed of the cellular phone 410 to a threshold, and/or check whether the cellular phone 410 is traveling along a first type of road. Alternately, the cellular phone tracking module 480 can be associated with the traffic monitoring module 112 and the location data can be sent from the cellular phone 410 to the traffic monitoring module 112 for processing.

Figure 17:
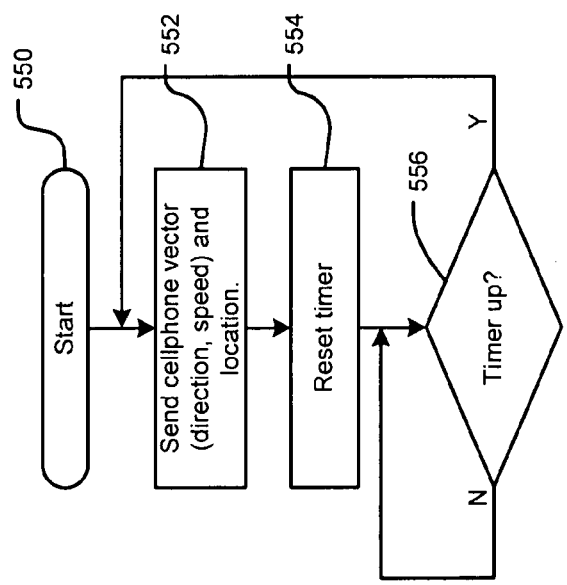
FIG. 17 is a flow chart illustrating exemplary steps performed by a cellular phone for transmitting data.

Referring now to FIG. 17, exemplary steps performed by a cellular phone 410 for transmitting data are shown. In this exemplary embodiment, the cellular phone 410 sends cellular phone vector and location data on a periodic basis. The data transmission may be selectively enabled while the cellular phone 410 is on and/or when the cellular phone 410 is on and moving at a speed greater than a threshold, on certain types of roads, and/or using other criteria. Control begins with step 550. In step 552, the cellular phone 410 sends vector and location data. In step 554, a timer is reset. In step 556, control determines whether a timer is up. If false, control returns to step 556. If step 556 is true, control returns to step 552. Control may be performed by the GPS module 477 or using any other control module in the cellular phone 410. Alternately and/or in addition to the foregoing, the traffic monitoring system 112 may periodically query the cellular phone 410 remotely for vector and/or location data. The cellular phone 410 may respond to the query by sending the vector and/or location data. The traffic monitoring system 400 may vary the time between queries as needed to increase or decrease granularity.

Figure 18:
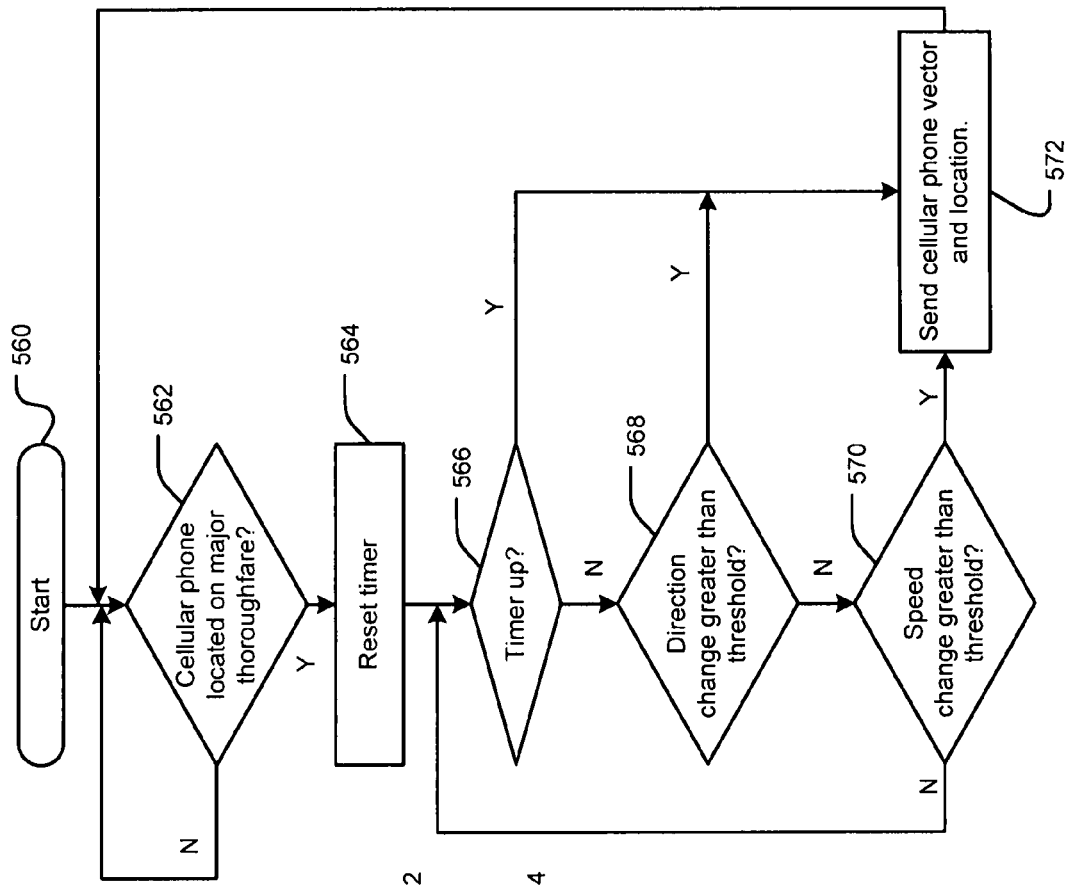
FIG. 18 is a flow chart illustrating alternate exemplary steps performed by a cellular phone for transmitting data.

Referring now to FIG. 18, alternate exemplary steps performed by the cellular phone 410 for transmitting data are shown. Control begins with step 560. In step 562, control determines whether the cellular phone 410 is located on a first type of road. For example, the first type of road may include major thoroughfares that may be defined to include freeways, highways and major streets. The first type of road may exclude smaller streets, residential areas and low traffic streets to reduce the amount of data being sent. Since traffic is low on these types of roads, traffic information may not be needed.

If step 562 is false, control returns to step 562. If step 562 is true, control resets a timer in step 564. In step 566, control determines whether a timer is up. If not, control continues with step 568 and determines whether the cellular phone 410 has a direction change that is greater than a first threshold. If not, control continues with step 570 and determines whether the cellular phone 410 has incurred a speed change that is greater than a second threshold. Steps 566, 568 and 570 also tend to limit data that is being transmitted by the cellular phone 410 to the traffic monitoring system 400. One or more of these steps may be performed.

Figure 19:
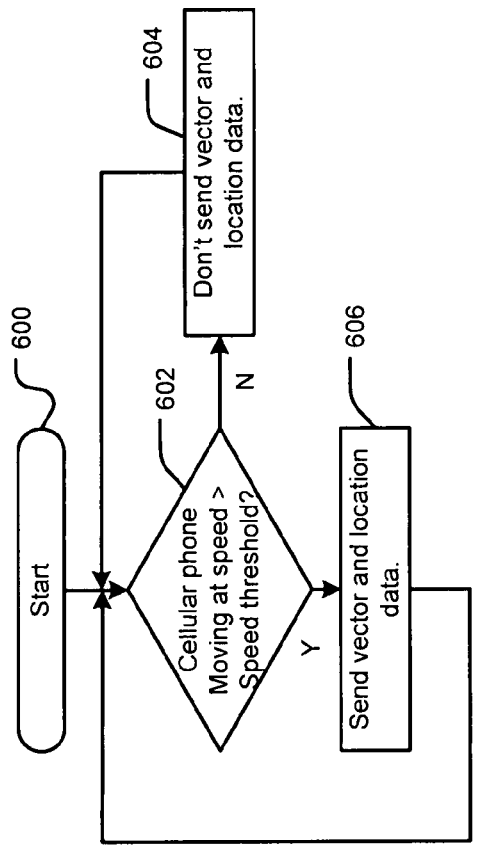
FIG. 19 is a flowchart illustrating steps for selectively sending data when the cellular phone is moving at a speed greater than a first threshold.

Referring now to FIG. 19, exemplary steps for selectively sending data when the cellular phone 410 is moving at a speed greater than a first threshold are shown. These steps may be performed in addition to and/or instead of other steps described herein. These steps may be performed by the cellular phone 410, the cellular phone tracking module 480, and/or the traffic monitoring system 400 (which may discard the data when the speed is lower than the threshold). Control begins with step 600. In step 602, control determines whether the cellular phone 410 is moving at a speed that is greater than a first speed threshold. If not, the vector and location data is not sent to the traffic monitoring system 400 and/or is not used by the traffic monitoring system 112 in step 604. If step 602 is true, the vector and location data is sent and/or used by the traffic monitoring system 400 in step 606.

Figure 20:
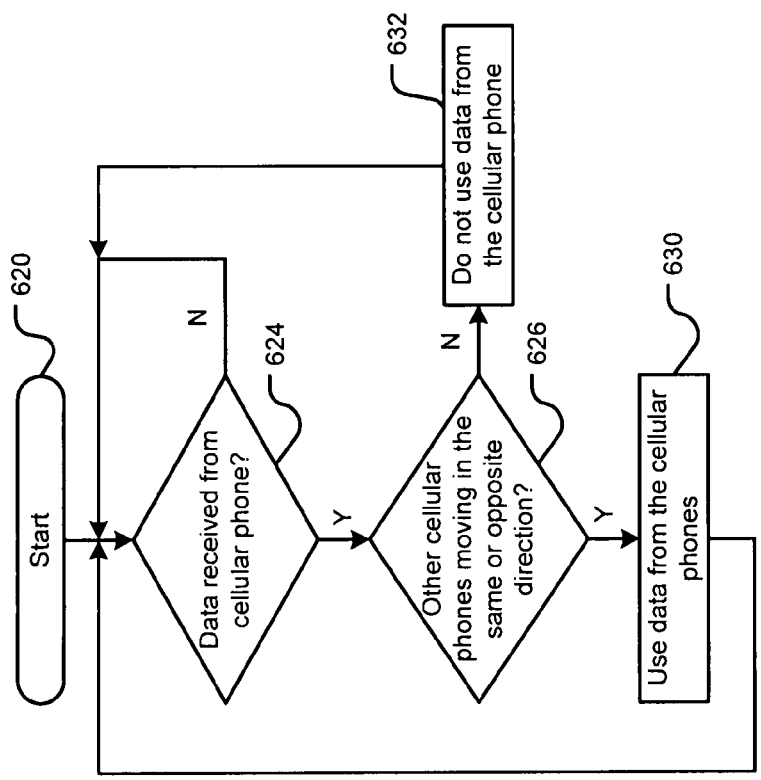
FIG. 20 is a flowchart illustrating steps for selectively using data from cellular phones when more than one cellular phone are located within a predetermined distance and are moving in the same or opposite direction and/or at a similar speed.

Referring now to FIG. 20, exemplary steps for selectively using data from cellular phones when more than one cellular phone is moving in the same or opposite direction and/or at a similar speed are shown. These steps may be performed in addition to and/or instead of other data validation steps described herein. Control begins with step 620. In step 624, control determines whether data has been received from a cellular phone. If not, control returns to step 624. Otherwise, control continues with step 626 and determines whether other cellular phones are moving in the same or opposite direction as the cellular phone 410. If not, control continues with step 632 and the data from the cellular phone 410 is not used and/or the weight given to the data is decreased as compared to when step 626 is true. If step 626 is true, the data from the cellular phone 410 may be used in step 630 and/or the weight given to the data is increased as compared to when step 626 is false. In addition, when the cellular phones are traveling in the same or opposite directions at similar speeds, the traffic monitoring system 400 can also determine whether or not they are traveling on a road and/or are located within a predetermined distance from each other as a further verification.

Figure 21:
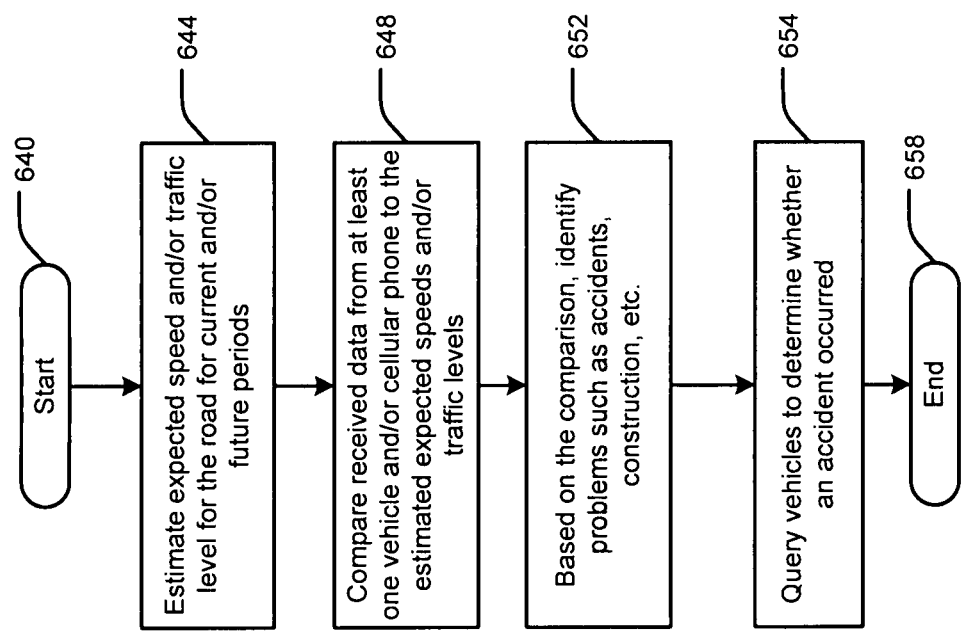
FIG. 21 is a flowchart illustrating steps for selectively predicting atypical events such as construction and/or accidents based on estimate expected speed or traffic flow for a given set of conditions.

Referring now to FIG. 21, exemplary steps for selectively predicting atypical events such as construction and/or accidents based on estimate expected speed or traffic flow for a given set of conditions are shown. Control begins in step 640. In step 644, the expected speed and/or traffic level for a road is estimated for current and/or future periods in step 644. The estimated expected speed may be specific to the day of the week, the time of the year, the time of the day, weather, holidays, etc.

In step 648, received data from at least one vehicle and/or cellular phone is compared to the estimated expected speed and/or traffic levels. Based on the comparison, problems such as accidents, construction and/or other atypical events may be tentatively identified in step 652. For example, if the average expected speed for the road on a particular day of the week and time of the day is 55 mph and the speed of the cellular phone is 10 mph, it may be reasonable to assume that there may be a problem.

In step 654, one or more vehicles may be queried to determine whether an accident or other atypical event has occurred. The query may be performed using the remote service assistance system and/or the cellular system. For example the cellular system may be used to call the cellular phone and inquire as to the traffic conditions. Text messaging may be used. In other words, a text message may be sent to the user and may provide a list of possible problems for selection such as accident, construction, slow traffic, etc. The user may indicate that an accident (or other problem) has occurred, which can be relayed to other subscribers.

Figure 22:
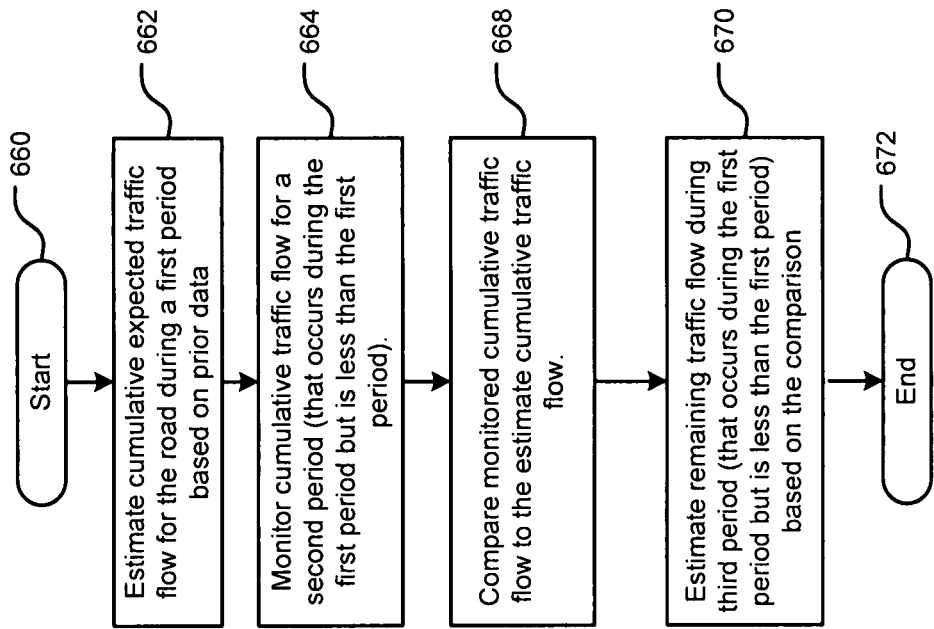
FIG. 22 is a flowchart illustrating steps for selectively predicting future traffic flow based on prior traffic flow.

Referring now to FIG. 22, exemplary steps for selectively predicting future traffic flow based on prior traffic flow are shown. Control begins with step 660. In step 662, cumulative expected traffic flow for a road is estimated during a first period based on historical data. The traffic flow may be an estimate of the number of cars traveling along a road in a one direction during a morning or evening rush hour for a given day of the week and time of the year. For example only, the first period may be from 6 am to 10 am on Monday. During the first period, the number of vehicles traveling south on a certain road may average 145,000 vehicles. The estimated traffic flow may be based on samples received in the past and/or based on statistical analysis. In other words, not all of the vehicles may be monitored and/or include a cellular phone that is sending vector and/or location data and sampling analysis may be performed to estimate the total number of vehicles.

In step 664, cumulative traffic flow for a second period is estimated. The second period may occur during the first period and may be less than the first period. For example only, the second period may be from 6 am to 7:30 am and 80,000 vehicles may have traveled during that period. In step 668, the monitored cumulative traffic flow is compared to the estimated cumulative traffic flow. In the example, typically an average of 40,000 vehicles may travel during the second period. Therefore, traffic flowing during the remaining part of the first period may be lighter than usual since more traffic than normal occurred during the second period.

In step 670, the remaining traffic flow during a third-period may be estimated based on the comparison. In the example, the third period may be estimated traffic flow for the remaining period of the rush hour from 7:30 am to 10 am. Traffic during the third period may tend to be lower than average due to the higher number of vehicles traveling during the second period and the estimated total number of vehicles during the first period. Therefore, the traffic monitoring system may indicate to subscribers that lower than normal traffic levels are anticipated during the third period.

Referring now to FIG. 23, exemplary steps performed by the traffic monitoring system for receiving and processing traffic data based on data from cellular phones are shown. These steps can be performed in addition to other data collection from vehicles and/or other sources.

Control begins with step 720. In step 724, control receives data from the cellular phones. In step 728, control estimates average speeds on selected portions of thoroughfares based on data from one or more cellular phones. For example, the traffic monitoring system 400 may estimate average speeds for predetermined distances or increments, and/or for specific lanes. The traffic monitoring system 400 may also compare average speeds of different lanes. The increments may vary based on road type, conditions or calculated speeds. For example, as the difference between the average speeds and the posted speeds differ, the predetermined increment may be reduced in length.

Traffic information may be transmitted to the subscribers based upon calculations made on the collected cellular phone and/or vehicle data. The traffic information may be pushed to the subscribers and/or an inquiry/response technique may be used in step 730. Control ends in step 732. In addition to traffic information, parking data may also be transmitted to the subscribers using a push technique and/or an inquiry/response technique.

Referring now to FIG. 24A, an alternate traffic monitoring module 112 is shown to include a historical-based traffic estimating module 804, a current traffic monitoring module 808 and a traffic predicting module 812. The historical-based traffic estimating module 804 reviews historical data and develops estimates for a given time of day, day of week, time of year, holidays, and/or any other criteria. For example only, the historical-based traffic estimating module 804 may develop an average prior traffic level for a rush hour period from 4 pm to 7 pm for a road on a particular day and time of year. In this example, the average traffic level during the period may be equal to 100,000 vehicles.

The current traffic monitoring module 808 may monitor and/or estimate traffic levels during part of a rush hour period. The traffic predicting module 812 may predict remaining traffic levels during the period based on the estimate and the traffic level during part of the rush hour period. For example only, during the time from 4 pm to 5:30 pm, approximately 40,000 vehicles may have traveled as compared to an average of 60,000 on average during this time. Therefore, the traffic predicting module 812 may predict a higher than average traffic level for the remaining part of the period.

The present disclosure also compares travel paths defined by vector and location data over time to known map data to determine whether new roads have been created. Based on a speed of the cellular phone, new walking/hiking paths and/or biking paths may also be identified.

The identification of the new roads, walking/hiking paths and/or biking paths can be performed locally at the cellular phone or vehicle and used to locally update the map data of the same cellular phone or vehicle. The new roads, walking/hiking paths and/or biking paths can be identified at the cellular phone or vehicle and sent to the remote traffic monitoring system to allow selective updating of map data of other cellular phones. The new roads, walking/hiking paths and/or biking paths may also be identified at a central remote traffic monitoring system and sent to the vehicles and cellular phones as map data updates or at one or more distributed servers.

When the cellular phone or vehicle begins traveling on a path that does not align with a known road, the generation and/or transmission of vector and location data may be increased as compared to updates that occur when the cellular phone or vehicle is traveling over known roads. As a result, more detail relating to the new travel path may be obtained.

Figure 24D:
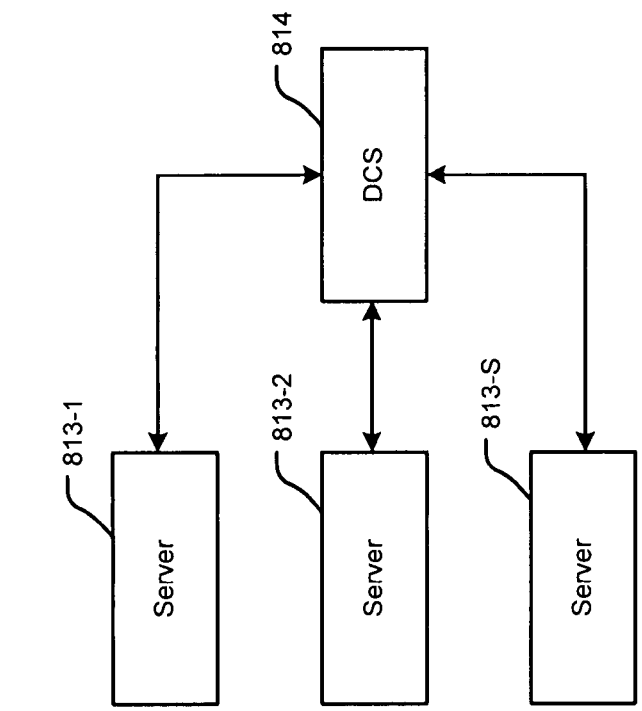
FIG. 24D is a functional block diagram of distributed communications system communicating with a plurality of servers.
Figure 24C:
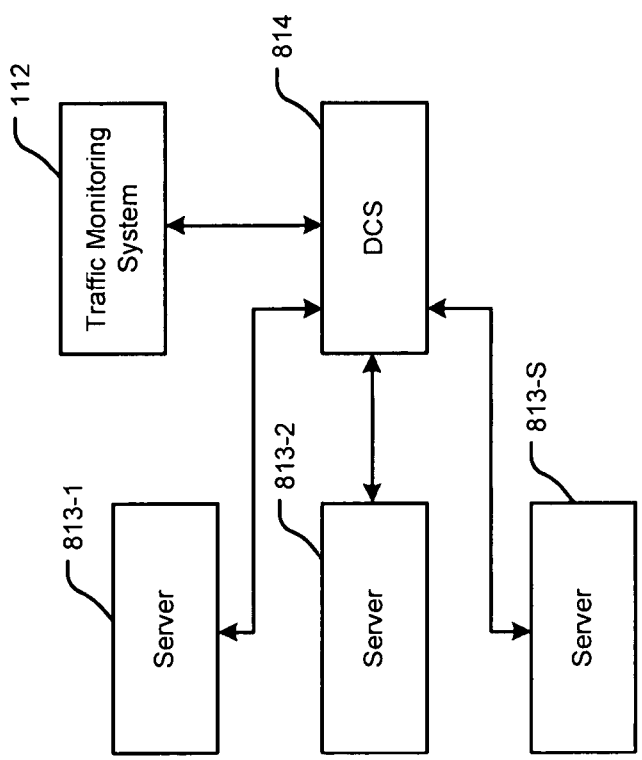
FIG. 24C is a functional block diagram of distributed communications system communicating with a plurality of servers and a traffic monitoring system.

Referring now to FIG. 24B-24D, the traffic monitoring module 112 shown in FIG. 24A can be implemented using a plurality of servers 813 that distribute the processing load and communicate on a peer-to-peer level. In other words, each of the servers 813 may perform processing for a particular geographic region and/or group of vehicles and/or cellular phones. As can be seen in FIGS. 24C and 24D, the servers 813 may exchange traffic information with a centralized traffic monitoring system, which can relay traffic information between the remote servers. Alternately the servers 813 may communicate on a peer-to-peer level and exchange traffic information with each other.

In FIG. 24C, servers 813-1, 813-2, . . . and 813-S (collectively servers 813) communicate with distributed communications system (DCS) 814 with the traffic monitoring module 112. For example only, the DCS 814 may include the Internet, an Intranet, a wide area network, a local area network or other communication system. In FIG. 24D, the servers 813 communicate directly with each other via the DCS 814. The servers 813 and/or the traffic monitoring system may receive data from the vehicles and/or cellular phones using any suitable medium.

Figure 25B:
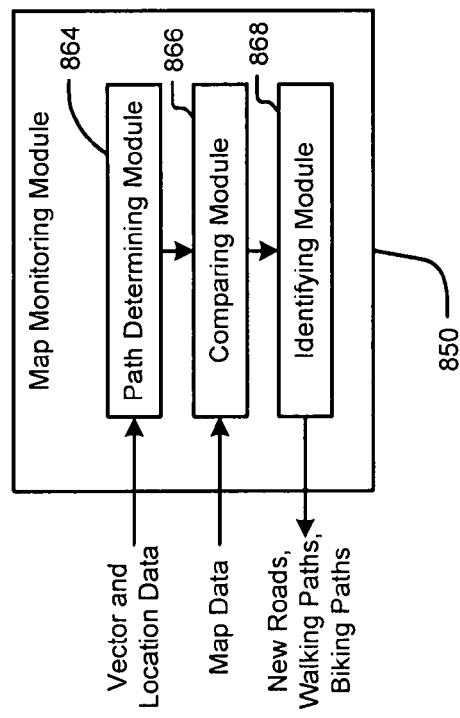
FIG. 25B is a functional block of an exemplary map monitoring module for the traffic monitoring module.
Figure 25A:
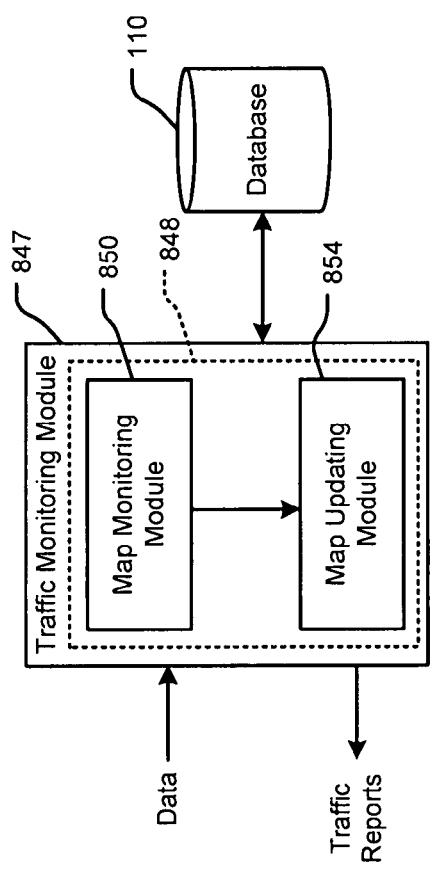
FIG. 25A is a functional block diagram of a traffic monitoring module including a map monitoring module and a map updating module.

Referring now to FIG. 25A, a traffic monitoring module 847 includes an adaptive map building module 848. The term remote is used in this context to refer to the remote location of the traffic monitoring module 847 relative to the data collecting devices such as the vehicles and cellular phones. The adaptive map building module 848 monitors travel paths of cellular phones and vehicles and determines whether new roads and/or hiking/bike paths should be created and added to the stored maps. The adaptive map building module 848 also determines whether and when new map updates should be sent. The adaptive map building module 848 also selects the subscribers that should receive the updated maps.

The adaptive map building module 848 may include a map monitoring module 850 and a map updating module 854. The map monitoring module 850 compares travel paths defined by vector and location data (received from one or more cellular phones and vehicles over time) to known or previously defined roads stored as map data. The vehicles or cellular phones may be traveling along a travel path that does not coincide with one of the known and stored roads, or biking/walking/hiking paths. If one or more vehicles and/or cellular phones travel along the same path, the map monitoring module 850 may assume that a new road or path has been built. The map updating module 854 may selectively update the map data of selected ones of the subscribers based on the new roads or paths that are identified.

The map monitoring module 850 may require certain conditions to be met before declaring a new travel path to be a new road. For example, the map monitoring module 850 may require traffic flow at a predetermined level, matching of paths of multiple subscribers within a predetermined variance, traffic flow over a predetermined time, predetermined speeds or average speeds on the path, and/or any other suitable criteria. Statistical analysis may also be used. The map monitoring module 850 may also require the path to start and end at other known roads.

The map monitoring module 850 may compare vector and location data generated by vector and location modules of one or more vehicles and/or cellular phones with map data previously stored in the database 110. When the vehicles and/or cellular phones are traveling along a path that does not align with roads in the map data, the map monitoring module 850 may determine whether sufficient criteria has been met to create a new road.

The criteria may include the number of times (or cellular phones or vehicles) traveling along the path with a predetermined time period, the speed of travel, and/or other criteria described above. The map updating module 854 may selectively update the local map data of one or more of the vehicles and/or cellular phones that generated the data (alternately, the map data of other vehicles and/or cellular phones can also be updated) when a new road or hiking/biking path has been identified. Additionally, the map monitoring module 850 and map updating module 854 may identify walking/hiking paths and biking paths based on a travel speed and/or other information as will be described below. The map monitoring module 850 and the map updating module 854 may be combined into a single module.

Referring now to FIG. 25B, the map monitoring module 850 is shown to include a path determining module 864, a comparing module 866 and an identifying module 868. The path determining module 864 determines a travel path of the cellular phone based on the vector and location data. The comparing module 866 compares the travel path to roads defined by the map data. The identifying module 868 selectively identifies new roads based on the comparison as described herein.

Figure 25C:
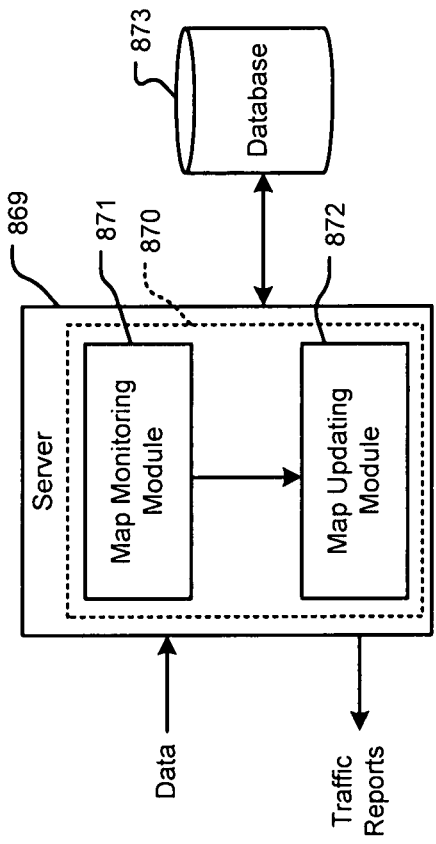
FIG. 25C is a functional block diagram of a server including a map monitoring module and a map updating module
Figure 25D:
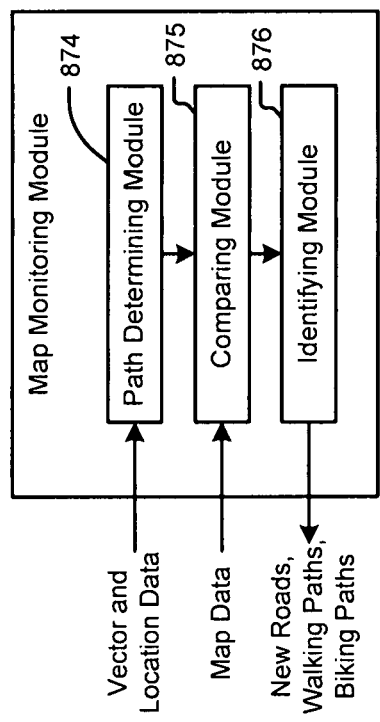
FIG. 25D is a functional block of an exemplary map monitoring module for the server.

Referring now to FIG. 25C, some of the adaptive map building may be performed by one or more servers 869 that may be remote from a central traffic monitoring module and the cellular phones and vehicles described herein. The term remote is used in this context to refer to the remote location of the server relative to the traffic monitoring module and the data collecting devices such as the vehicles and cellular phones. The servers 869 may perform processing of data from a predetermined geography or data source, monitor the vector and location data relative to the map data, selectively add new roads or biking/hiking paths, update the associated cellular phones and vehicles, and/or send updated map data to a remote traffic monitoring module. The server 869 may include an adaptive map building module 870.

The adaptive map building module 870 monitors travel paths of cellular phones and vehicles and determines whether new roads and/or hiking/bike paths should be created and added to the stored maps. The adaptive map building module 870 also determines whether and when new map updates should be sent. The adaptive map building module 870 also selects the subscribers that should receive the updated maps. The adaptive map building module 870 includes a map monitoring module 871 and a map updating module 872, which operate as further described above and below.

The servers may communicate with other servers in a peer-to-peer mode or via a traffic monitoring module, as described above in conjunction with FIGS. 24C and 24D.

Referring now to FIG. 25B, an exemplary map monitoring module 871 is shown. The map monitoring module 871 includes a path determining module 874, a comparing module 875 and an identifying module 876. The path determining module 876 determines a travel path of the cellular phones and vehicles based on the vector and location data. The comparing module 875 compares the travel path to roads defined by the map data. The identifying module 876 selectively identifies new roads based on the comparison as further described above and below.

Figure 26:
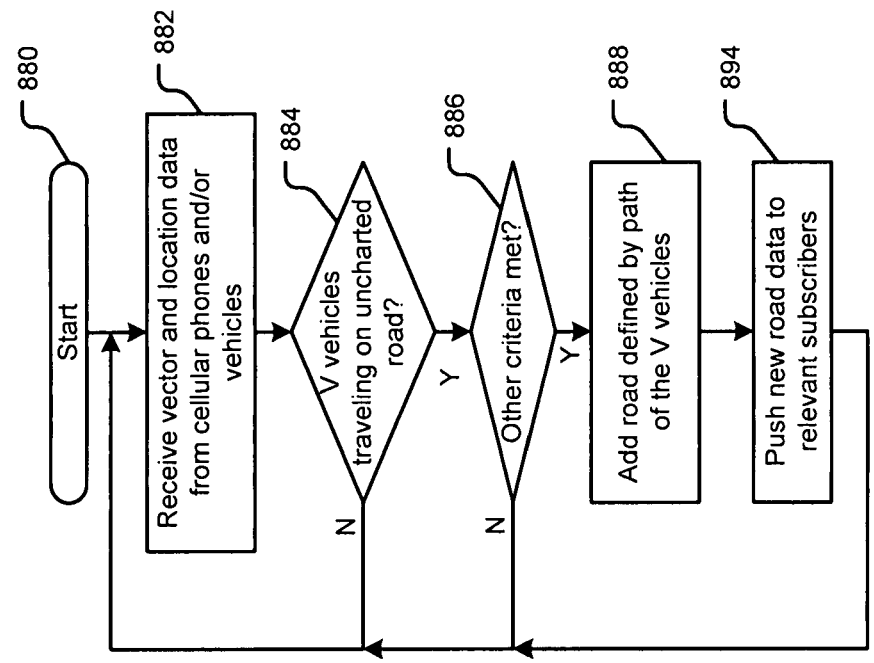
FIG. 26 is an exemplary flowchart illustrating an exemplary method performed by the map monitoring module of FIG. 25.

Referring now to FIG. 26, an exemplary method performed by the adaptive map building module 848 of FIG. 25 is shown. Control begins with step 880 and proceeds to step 882. In step 882, the adaptive map building module 848 receives vector and location data from one or more cellular phones and/or vehicles.

In steps 884 and 886, the adaptive map building module 848 determines whether sufficient predetermined criteria relating to the creation of a road has been met. For example only, in step 884 control determines whether V vehicles have traveled on a path, where V is an integer greater than or equal to one. If step 884 is true, the adaptive map building module 848 may also determine whether additional criteria has been met in step 886.

If all of the criteria has been met as determined in steps 884 and 886, the adaptive map building module 848 creates new map data defined by the path of the V vehicles in step 888. In step 894, the traffic monitoring module 112 may push the new map data to relevant subscribers. The relevant subscribers may be those subscribers that are within a predetermined geographical distance from the new road, subscribers who pay for updates, etc.

The traffic monitoring module 112 may send or push the new map data to the subscribers when a new road is identified, on a predetermined periodic basis, when an event occurs, upon user requests, and/or using any other basis. The new map data may also be selectively sent when a subscriber is traveling within a predetermined distance of the new road or is likely to travel on the new road.

Referring now to FIGS. 27A and 27B, a cellular phone 900 including an adaptive map building module 910 is shown. Reference numbers from FIG. 16A have been used in FIG. 27 where appropriate. A global positioning system (GPS) 904 includes an adaptive mapping module 906. Alternately, the adaptive map building module 906 may be a stand alone module or integrated with another cellular phone module.

The adaptive mapping module 906 includes a map monitoring module 910 and a map updating module 912. The map monitoring module 910 may compare vector and location data generated by the vector and location module 478 with map data previously stored in the memory 479. When the cellular phone 900 is traveling along a path that does not align with roads in the map data, the map monitoring module 910 may determine whether sufficient criteria has been met to create a new road.

The criteria may include the number of times traveled along the path, the speed of travel, and/or other criteria described above. The map updating module 912 may selectively update the local map data of the cellular phone 900 when a new road has been identified. Additionally, the map monitoring module 910 and map updating module 912 may identify walking/hiking paths and biking paths based on a travel speed and/or other information as will be described below.

The map updating module 912 may also selectively send new map data, walking/hiking data and/or biking data to the traffic monitoring module 112. The map monitoring module 910 and the map updating module 912 may be combined into a single module.

In FIG. 27B, the map monitoring module 910 is shown to include a path determining module 914, a comparing module 916 and an identifying module 918. The path determining module 914 determines a travel path of the cellular phone based on the vector and location data. The comparing module 916 compares the travel path to roads defined by the map data. An identifying module 918 selectively identifies new roads based on the comparison as described herein.

Figure 28:
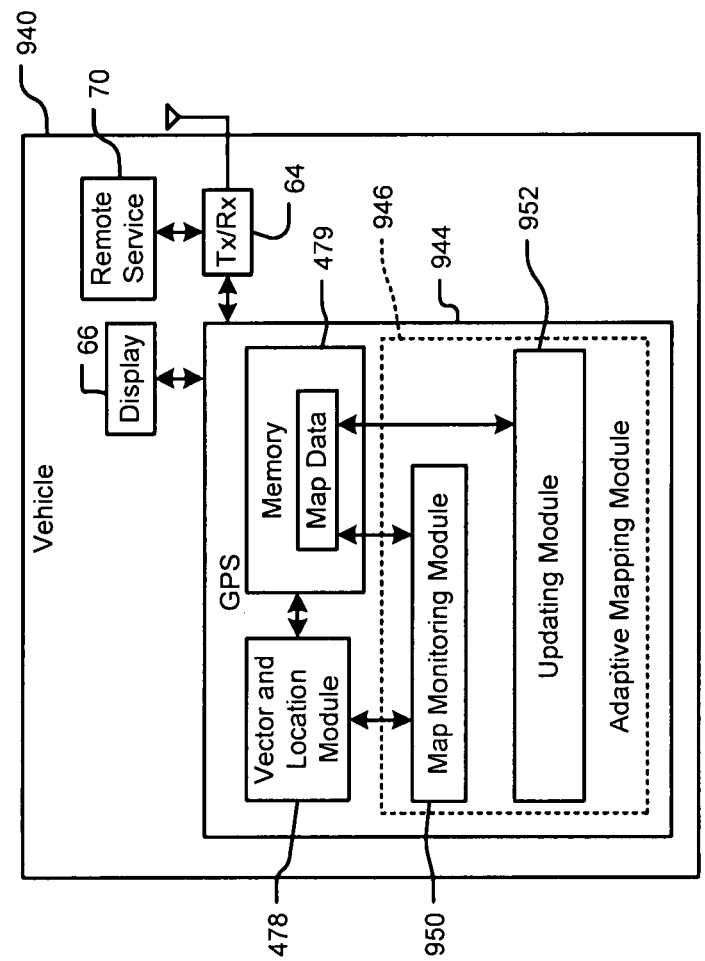
FIG. 28 is a functional block diagram of a vehicle including a user-based adaptive map building module.

Referring now to FIG. 28, a vehicle 940 including a user-based adaptive map building module 946 is shown. Reference numbers from FIG. 3A have been used where appropriate. A global positioning system (GPS) 944 may include a user-based adaptive mapping module 946. Alternately, the adaptive map building module 946 may be a stand alone module or integrated with another vehicle module. The adaptive map building module 946 includes a map monitoring module 950 and a map updating module 952. The map monitoring module 950 may compare vector and location data generated by the vector and location module 478 to map data previously stored in the memory 479.

When the vehicle 940 is traveling along a path that does not align with the map data, the map monitoring module 950 and/or the map updating module 952 may determine whether sufficient criteria has been met to create a new road. The criteria may include the number of times traveled along the path, the speed of travel, and/or other criteria described above. The map updating module 952 may selectively update the local map data of the cellular phone 900 when a new road has been identified. The map updating module 912 may also selectively send new road information to the traffic monitoring module 112. The map monitoring module 950 may be similar to that shown in FIG. 27B.

Figure 29:
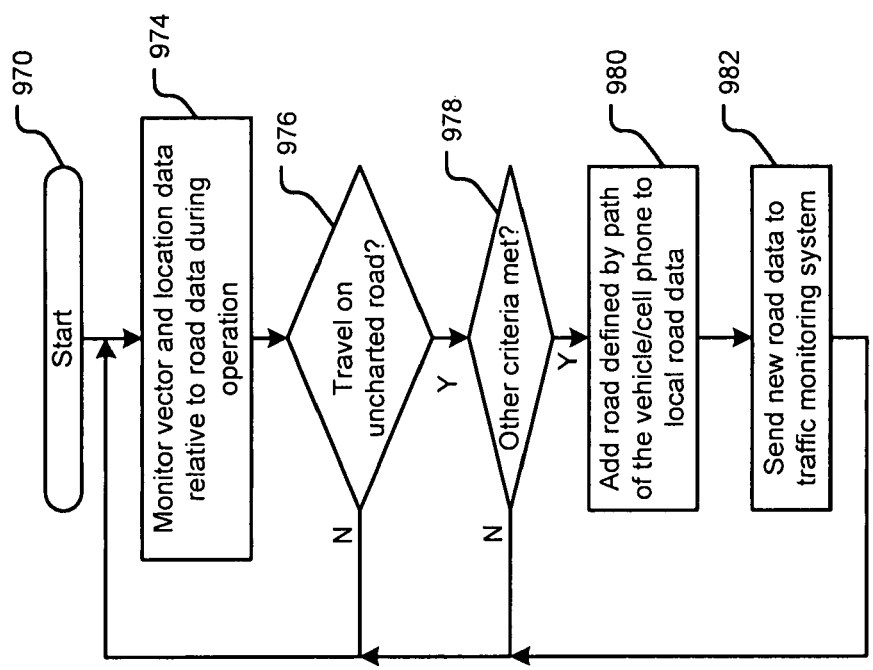
FIG. 29 is an exemplary flowchart illustrating an exemplary method performed by the adaptive map building modules.

Referring now to FIG. 29, an exemplary method performed by the adaptive map building modules is shown. Control begins with step 970 and proceeds to step 974. In step 974, control monitors vector and location data relative to roads in the map data during operation. In step 976, control determines whether the cellular phone or vehicle is traveling on a travel path that is not stored in the map data. Additional criteria may also be evaluated in step 978 as described above. If the additional criteria is met, the adaptive mapping module adds a new road defined by the travel path of the vehicle or cellular phone to the local map data in step 980. In step 982, the map updating module 952 may selectively send new map data to the remote traffic monitoring system.

Figure 30:
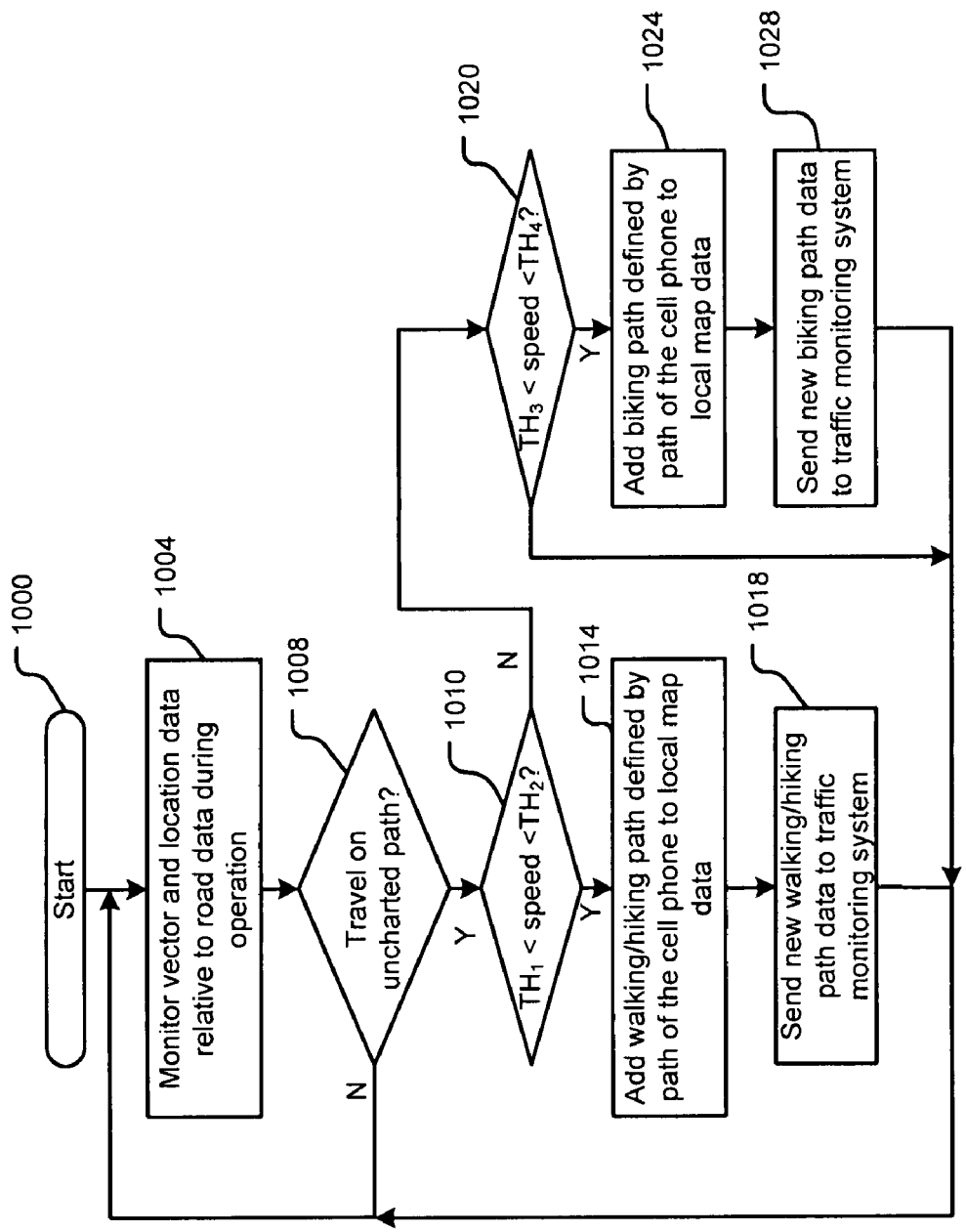
FIG. 30 is an alternate exemplary flowchart illustrating steps performed by the adaptive map building modules.

Referring now to FIG. 30, an exemplary method performed by the adaptive map building module 906 of FIG. 27 is shown. The cellular phone may be carried by a person while traveling along a walking/hiking path and/or a biking path. The adaptive map building modules monitor movement and selectively add the walking/hiking or biking paths to the map data.

Control begins with step 1000. In step 1004, control monitors vector and location data relative to the map data during operation. In step 1008, control determines whether the cellular phone is traveling on a path that is not defined by the map data. If step 1008 is true, control determines whether the speed on the path is greater than a first speed threshold and less than a second speed threshold in step 1010. The first speed threshold may be equal to a typical minimum walking speed. For example only, the first speed threshold may be a value in a range of 1 to 3 mph. The second speed threshold may be equal to a second value that is a typical maximum walking speed. For example only, the second speed threshold may be set in the range of 3 to 5 mph. For example only, the first speed threshold may be set to 2 mph and the second speed threshold may be set to 5 mph.

Alternately, a higher second speed threshold may be used to monitor runners running on the paths. For example, the second speed threshold may be set equal to a value in the range of 8 to 15 mph.

If step 1010 is met, it is likely that the user of the cellular-phone is walking along a walking/hiking path. Therefore, in step 1014, the walking/hiking path may be added to the map data. In step 1018, the new walking/hiking path data may be selectively sent to the traffic monitoring system. Additional validation criteria may also be performed as described above.

If step 1010 is false, control continues with step 1020 and determines whether the speed of the user along the path is greater than a third speed threshold and less than a fourth speed threshold. The third speed threshold may be equal to a typical minimum biking speed such as 5 mph. The fourth speed threshold may be equal to a typical maximum biking speed such as 25 mph. If step 1020 is true, it is likely that a user is operating a bicycle along a bike path. Therefore, in step 1024, the biking path may be added to the local map data. In step 1028, new biking path data may also be selectively sent to the traffic monitoring system.

Figure 31:
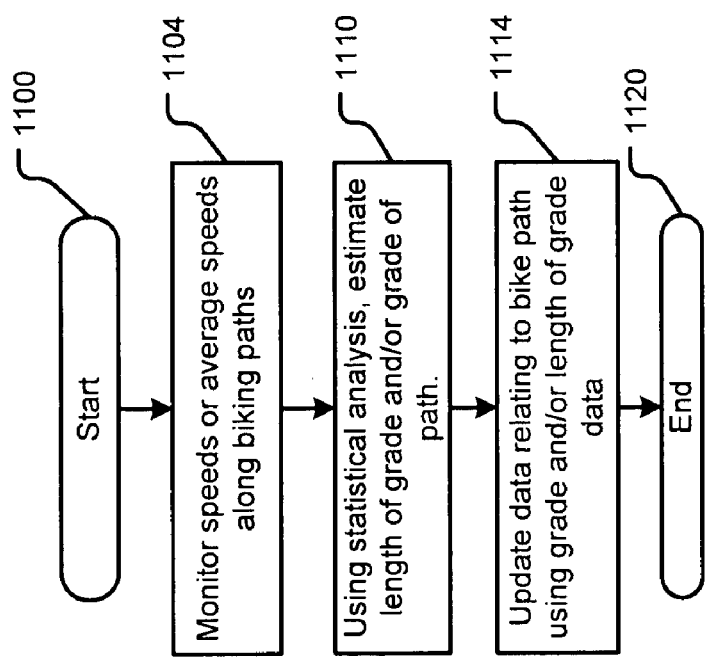
FIG. 31 is an exemplary flowchart illustrating an exemplary method for identifying a grade and/or a length of grade of a bike path.

Referring now to FIG. 31, an exemplary method for identifying whether a path is uphill or downhill, estimating a percentage grade and/or estimating a length of the grade of a bike path is shown. Control begins with step 1100 and proceeds to step 1104. In step 1104, a speed or average speed along a biking path is monitored for one or more cellular phones. As bicyclists ride uphill, their speed will tend to slow relative to flatter sections of the path. As bicyclists ride downhill, their speed will tend to increase relative to flatter sections of the path. For example, for cellular phones traveling in one direction on the path, the average speed may be 25 mph. For cellular phones traveling in the opposite direction on the same path, the average speed may be 7 mph. The increasing/decreasing trend may tend to identify downhill/uphill sections. These relative speeds may tend to identify a section that is downhill in the one direction and uphill in the opposite direction. Additionally, the relative grade may also be estimated based on the increase/decrease in speed. The relative speeds may also be used to determine when the grade starts and stops. In other words, when the average speeds in opposite directions are statistically significant, the differences can be used to identify the start and end of a grade.

In step 1110, the length of grade, the up/down pitch of the grade and/or the percent grade of the biking path may be estimated. In other words, the map data may reflect sections of the biking path that are uphill and downhill and the lengths of the uphill/downhill sections. For example only, the estimation may be done using statistical analysis. In step 1114, data relating to a bike path may be updated using the grade or length of grade information. Control ends in step 1120.

Those skilled in the art can now appreciate from the foregoing description that the broad teachings of the present invention can be implemented in a variety of forms. As can be appreciated, steps of methods disclosed and claimed can be performed in an order that is different than that described and claimed herein without departing from the spirit of the present invention. Therefore, while this invention has been described in connection with particular examples thereof, the true scope of the invention should not be so limited since other modifications will become apparent to the skilled practitioner upon a study of the drawings, the specification and the following claims.

What is claimed is:

1. A traffic monitoring system comprising:
memory for storing map data;
a traffic report generating module that receives vector and location data from at least one of cellular phones and vehicles and that generates and transmits traffic reports based on said vector and location data; and
a map monitoring module including:
a path determining module that determines a travel path of said at least one of said cellular phones and said vehicles based on said vector and location data;
a comparing module that compares said travel path to roads defined by said map data; and
an identifying module that selectively identifies new roads based on said comparison.

2. The traffic monitoring system of claim 1 further comprising a generating module that generates new road data when said new roads are identified.

3. The traffic monitoring system of claim 2 further comprising an updating module that selectively transmits said new road data to said at least one of said cellular phones and said vehicles.

4. The traffic monitoring system of claim 3 wherein said path determining module determines a speed of said cellular phones on said travel path, said comparing module compares said speed to first and second predetermined speeds and said identifying module selectively identifies new walking paths based on said comparison.

5. The traffic monitoring system of claim 4 wherein said generating module generates new walking path data when said new walking paths are identified.

6. The traffic monitoring system of claim 5 wherein said updating module selectively transmits said new walking path data to said at least one of said cellular phones and said vehicles.

7. The traffic monitoring system of claim 4 wherein said first predetermined speed is equal to a predetermined minimum walking speed and said second predetermined speed is equal to a predetermined maximum walking speed.

8. The traffic monitoring system of claim 3 wherein said path determining module determines a speed of said cellular phones on said travel path, said comparing module compares said speed to first and second predetermined speeds and said identifying module selectively identifies new biking paths based on said comparison, wherein said first predetermined speed is equal to a predetermined minimum biking speed and said second predetermined speed is equal to a predetermined maximum biking speed.

9. The traffic monitoring system of claim 8 wherein said generating module generates new biking path data when said new biking paths are identified.

10. The traffic monitoring system of claim 9 wherein said updating module selectively transmits said new biking paths to said at least one of said cellular phones and said vehicles.

11. A traffic monitoring system comprising:
a memory for storing map data;
traffic report generator for receiving vector and location data from at least one of cellular phones and vehicles and for generating and transmitting traffic reports based on said vector and location data; and
map monitor means for updating said map data including:
path determining device for determining a travel path of said at least one of said cellular phones and said vehicles based on said vector and location data;
a comparator for comparing said travel path to roads defined by said map data; and
identifier for selectively identifying new roads based on said comparison.

12. The traffic monitoring system of claim 11 further comprising generator means for generating new road data when said new roads are identified.

13. The traffic monitoring system of claim 12 further comprising an updating device for selectively transmitting said new road data to said at least one of said cellular phones and said vehicles.

14. The traffic monitoring system of claim 13 wherein said path an identifier determines a speed of said cellular phones on said travel path, said comparator compares said speed to first and second predetermined speeds and said identifier selectively identifies new walking paths based on said comparison.

15. The traffic monitoring system of claim 14 wherein said generator generates new walking path data when said new walking paths are identified.

16. The traffic monitoring system of claim 15 wherein said updating device selectively transmits said new walking path data to said at least one of said cellular phones and said vehicles.

17. The traffic monitoring system of claim 14 wherein said first predetermined speed is equal to a predetermined minimum walking speed and said second predetermined speed is equal to a predetermined maximum walking speed.

18. The traffic monitoring system of claim 13 wherein said path identifier determines a speed of said cellular phones on said travel path, said comparator compares said speed to first and second predetermined speeds and said identifying means selectively identifies new biking paths based on said comparison, wherein said first predetermined speed is equal to a predetermined minimum biking speed and said second predetermined speed is equal to a predetermined maximum biking speed.

19. The traffic monitoring system of claim 18 wherein said generator generates new biking path data when said new biking paths are identified.

20. The traffic monitoring system of claim 19 wherein said updating selectively transmits said new biking paths to said at least one of said cellular phones and said vehicles.

21. A method for providing a traffic monitoring system comprising:
storing map data;
receiving vector and location data from at least one of cellular phones and vehicles and generating and transmitting traffic reports based on said vector and location data; and
determining a travel path of said at least one of said cellular phones and said vehicles based on said vector and location data;
comparing said travel path to roads defined by said map data; and
selectively identifying new roads based on said comparison.

22. The method of claim 21 further comprising generating new road data when said new roads are identified.

23. The method of claim 22 further comprising selectively transmitting said new road data to said at least one of said cellular phones and said vehicles.

24. The method of claim 23 further comprising determining a speed of said cellular phones on said travel path, comparing said speed to first and second predetermined speeds and selectively identifying new walking paths based on said comparison.

25. The method of claim 24 further comprising generating new walking path data when said new walking paths are identified.

26. The method of claim 25 further comprising selectively transmitting said new walking path data to said at least one of said cellular phones and said vehicles.

27. The method of claim 24 wherein said first predetermined speed is equal to a predetermined minimum walking speed and said second predetermined speed is equal to a predetermined maximum walking speed.

28. The method of claim 23 further comprising:
determining a speed of said cellular phones on said travel path;
comparing said speed to first and second predetermined speeds; and
selectively identifying new biking paths based on said comparison, wherein said first predetermined speed is equal to a predetermined minimum biking speed and said second predetermined speed is equal to a predetermined maximum biking speed.

29. The method of claim 28 further comprising generating new biking path data when said new biking paths are identified.

30. The method of claim 29 further comprising selectively transmitting said new biking paths to said at least one of said cellular phones and said vehicles.

31. A computer program stored for use by a processor for providing a traffic monitoring system comprising:
storing map data;

receiving vector and location data from at least one of cellular phones and vehicles and generating and transmitting traffic reports based on said vector and location data; and determining a travel path of said at least one of said cellular phones and said vehicles based on said vector and location data;

comparing said travel path to roads defined by said map data; and selectively identifying new roads based on said comparison.

32. The computer program of claim 31 further comprising generating new road data when said new roads are identified.

33. The computer program of claim 32 further comprising selectively transmitting said new road data to said at least one of said cellular phones and said vehicles.

34. The computer program of claim 33 further comprising determining a speed of said cellular phones on said travel path, comparing said speed to first and second predetermined speeds and selectively identifying new walking paths based on said comparison.

35. The computer program of claim 34 further comprising generating new walking path data when said new walking paths are identified.

36. The computer program of claim 35 further comprising selectively transmitting said new walking path data to said at least one of said cellular phones and said vehicles.

37. The computer program of claim 34 wherein said first predetermined speed is equal to a predetermined minimum walking speed and said second predetermined speed is equal to a predetermined maximum walking speed.

38. The computer program of claim 33 further comprising:

determining a speed of said cellular phones on said travel path;

comparing said speed to first and second predetermined speeds; and selectively identifying new biking paths based on said comparison, wherein said first predetermined speed is equal to a predetermined minimum biking speed and said second predetermined speed is equal to a predetermined maximum biking speed.

39. The computer program of claim 38 further comprising generating new biking path data when said new biking paths are identified.

40. The computer program of claim 39 further comprising selectively transmitting said new biking paths to said at least one of said cellular phones and said vehicles.

41. The traffic monitoring system of claim 8 wherein said path determining module compares a difference in speed for travel in opposite directions on at least one biking path to identify grade information.

42. The traffic monitoring system of claim 8 wherein said path determining module compares speeds for travel in opposite directions on at least one biking path to identify grade information.

43. The traffic monitoring system of claim 18 wherein said path determining means compares a difference in speed for travel in opposite directions on at least one biking path to identify grade information.

44. The traffic monitoring system of claim 18 wherein said path determining means compares speeds for travel in opposite directions on at least one biking path to identify grade information.

45. The method of claim 28 further comprising comparing a difference in speed for travel in opposite directions on at least one biking path to identify grade information.

46. The method of claim 28 further comprising comparing speeds for travel in opposite directions on at least one biking path to identify grade information.

47. The computer program of claim 38 further comprising comparing a difference in speed for travel in opposite directions on at least one biking path to identify grade information.

48. The computer program of claim 38 further comprising comparing speeds for travel in opposite directions on at least one biking path to identify grade information.

* * * * *